B. M. DES JARDINS.
COMPUTING ATTACHMENT FOR TYPE WRITERS.
APPLICATION FILED APR. 27, 1904. RENEWED NOV. 12, 1912.

1,302,464.

Patented Apr. 29, 1919.
15 SHEETS—SHEET 1.

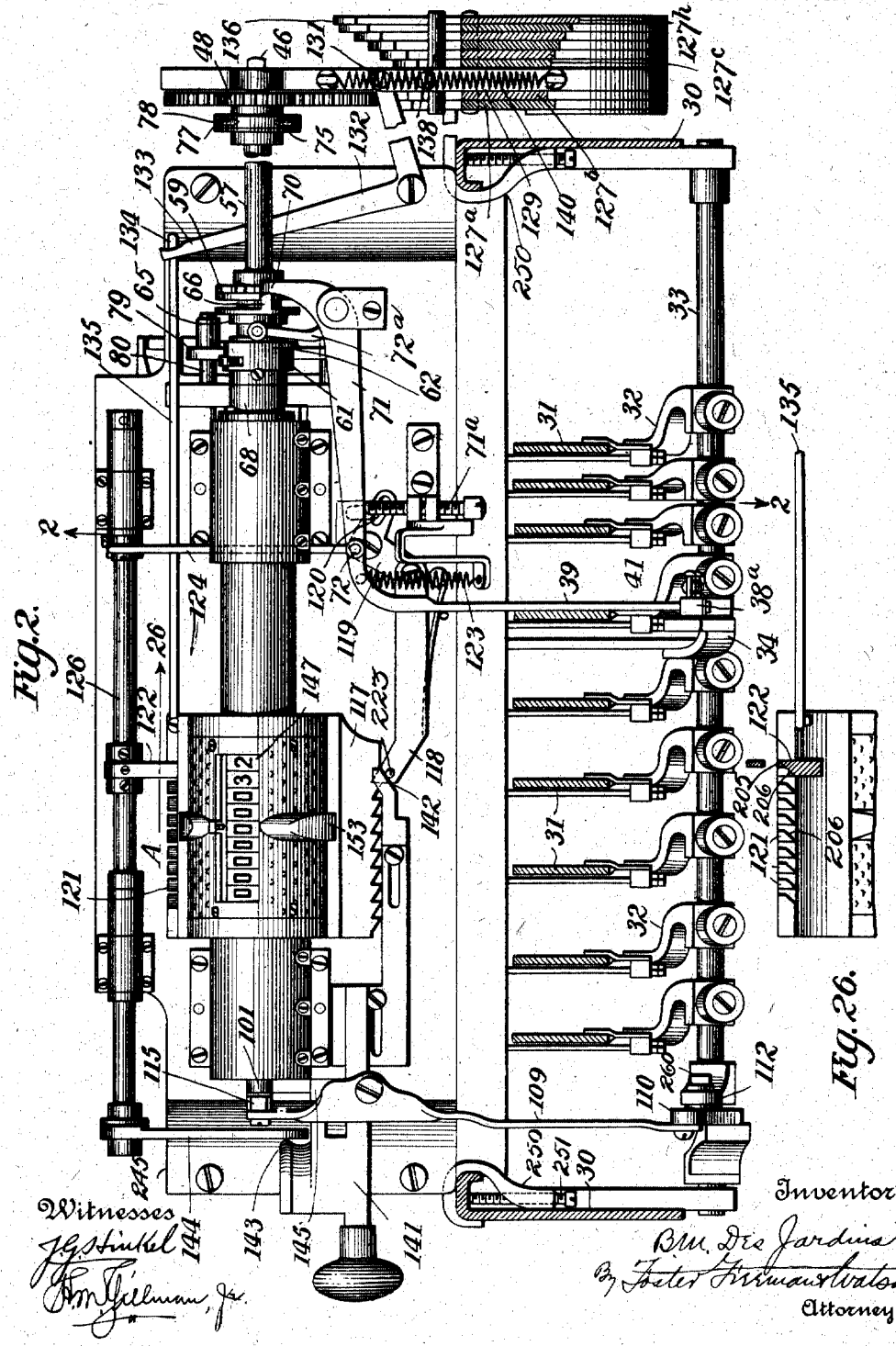

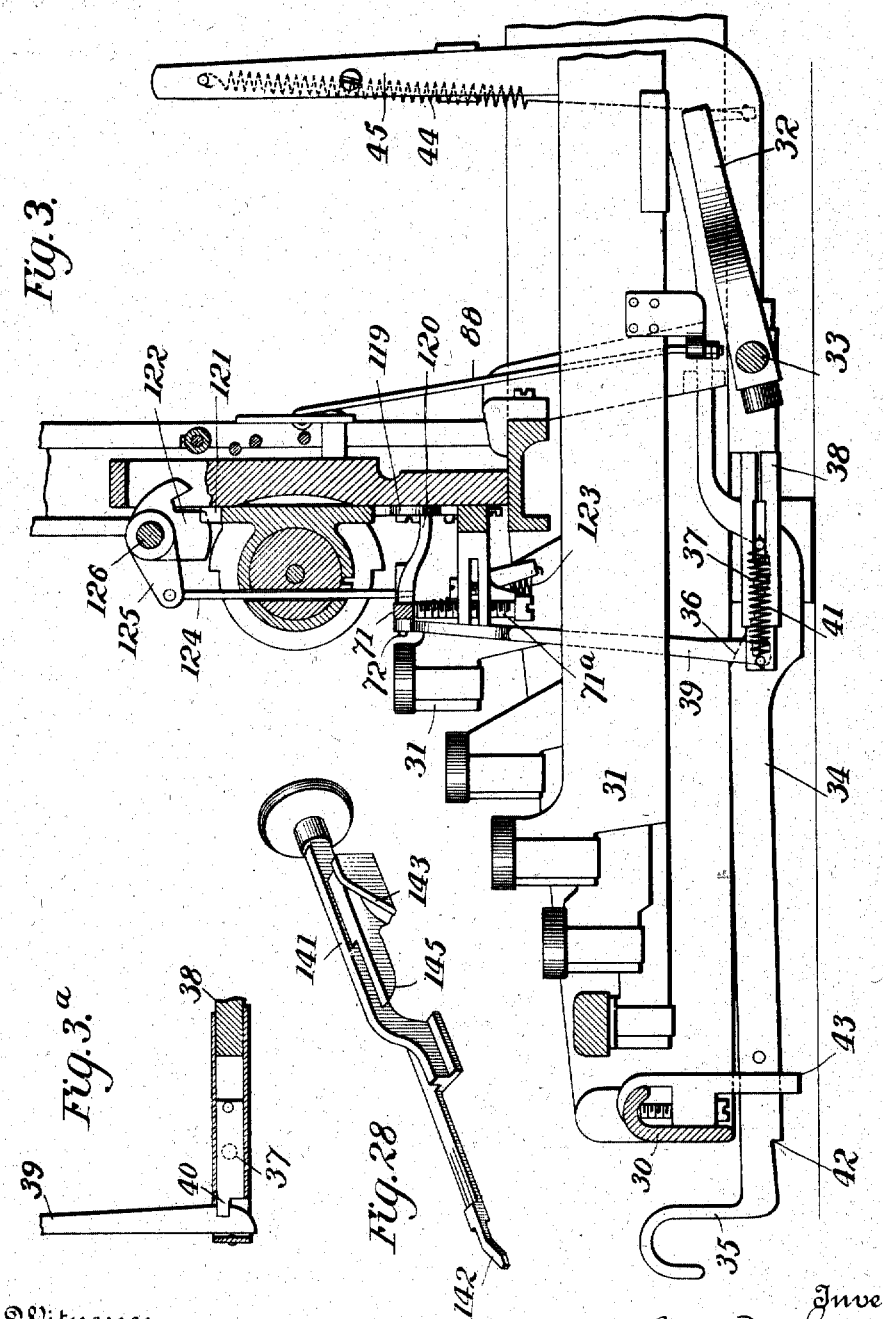

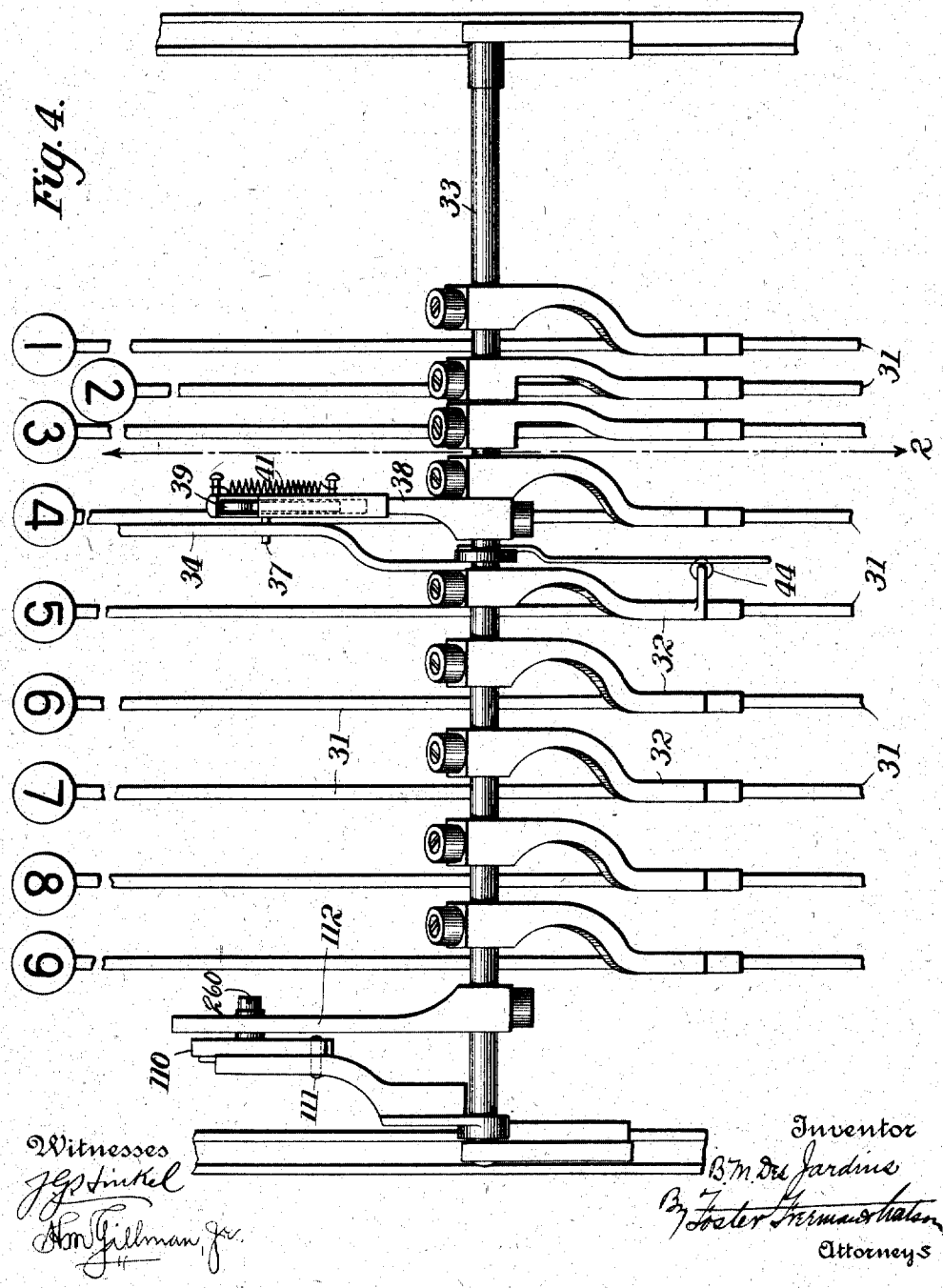

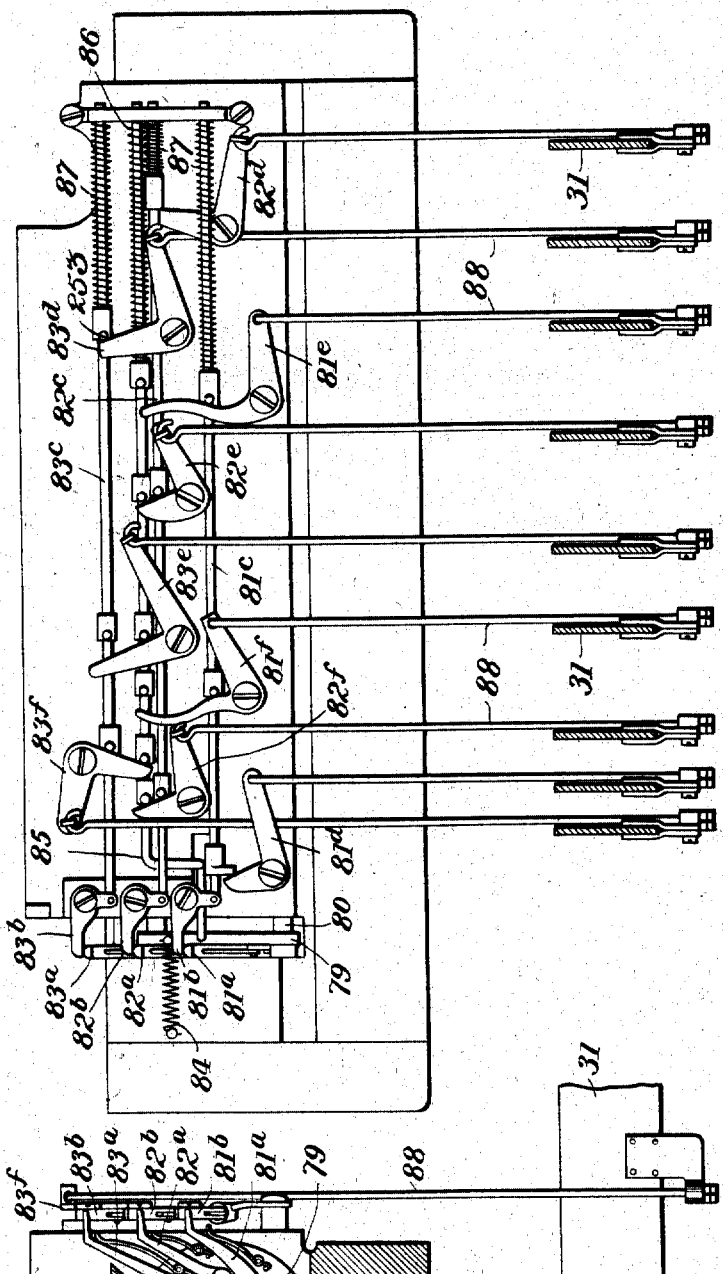

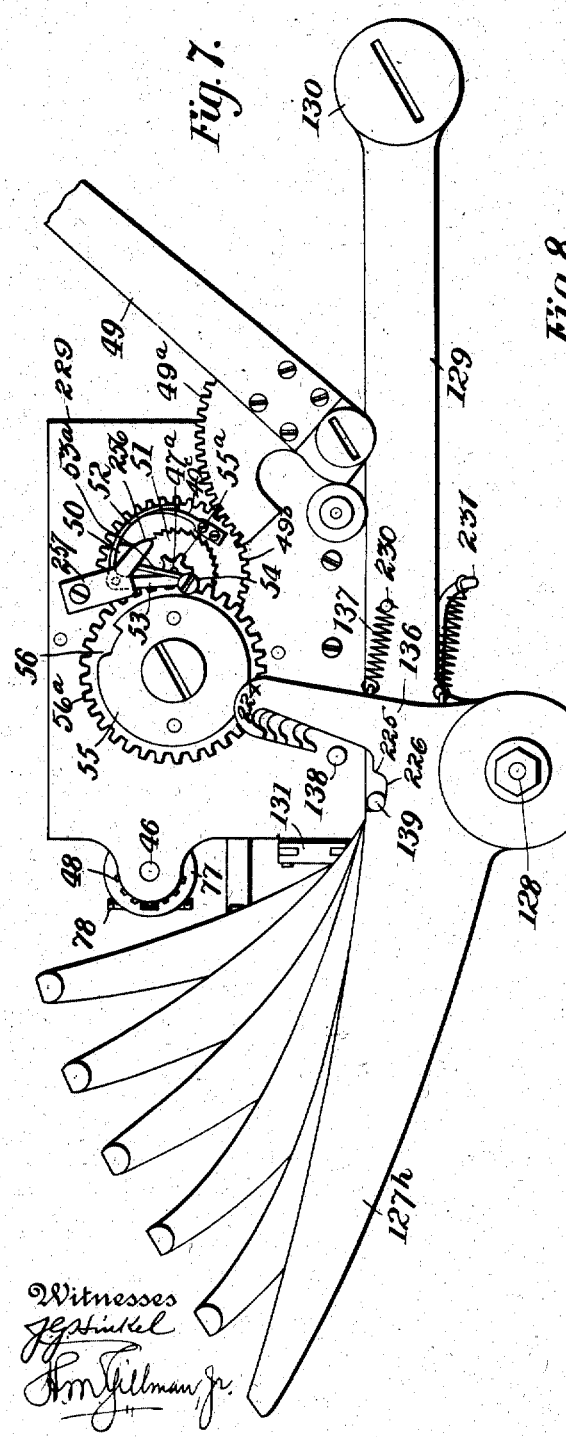

B. M. DES JARDINS.
COMPUTING ATTACHMENT FOR TYPE WRITERS.
APPLICATION FILED APR. 27, 1904. RENEWED NOV. 12, 1912.
1,302,464.
Patented Apr. 29, 1919.
15 SHEETS—SHEET 7.
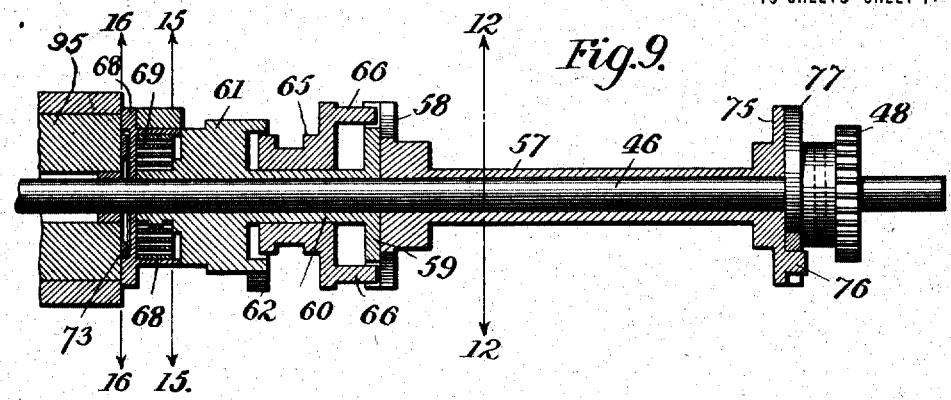
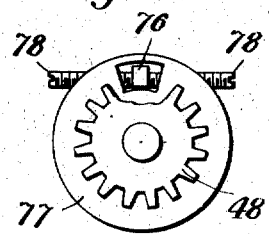
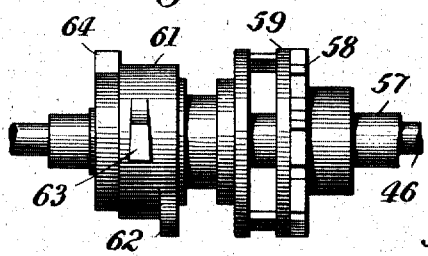
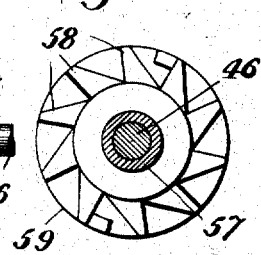
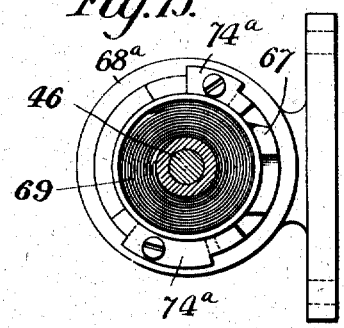
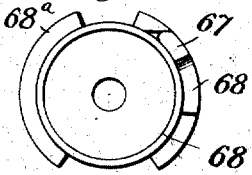
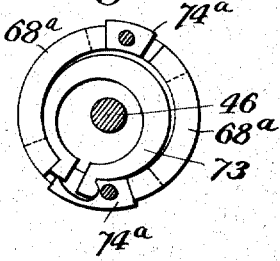
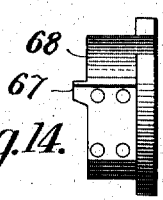

B. M. DES JARDINS.
COMPUTING ATTACHMENT FOR TYPE WRITERS.
APPLICATION FILED APR. 27, 1904. RENEWED NOV. 12, 1912.

1,302,464.

Patented Apr. 29, 1919.
15 SHEETS—SHEET 8.

Witnesses
J. G. Hinkel
B. M. Gillman, Jr.

Inventor
B. M. Des Jardins
By Foster Freeman & Watson
Attorneys

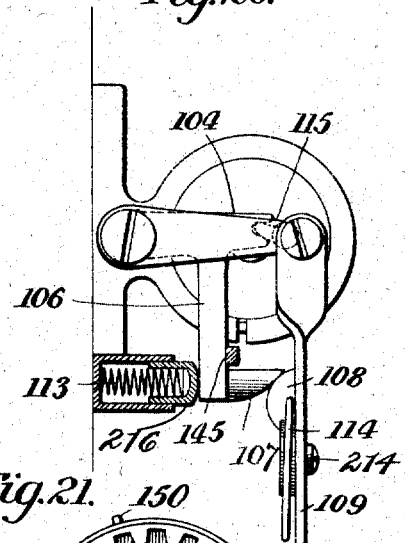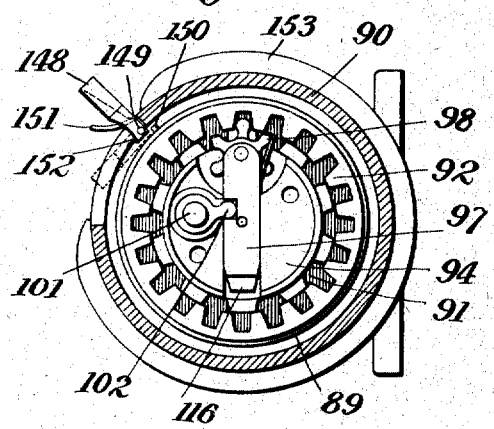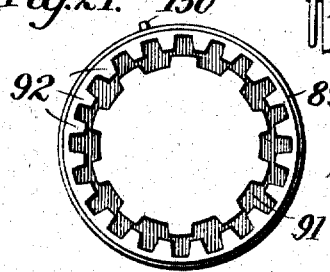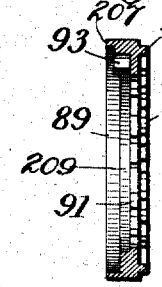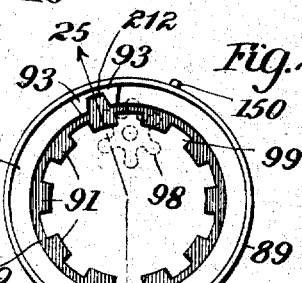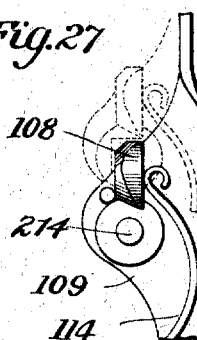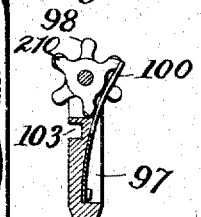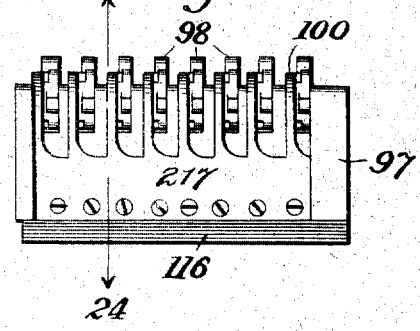

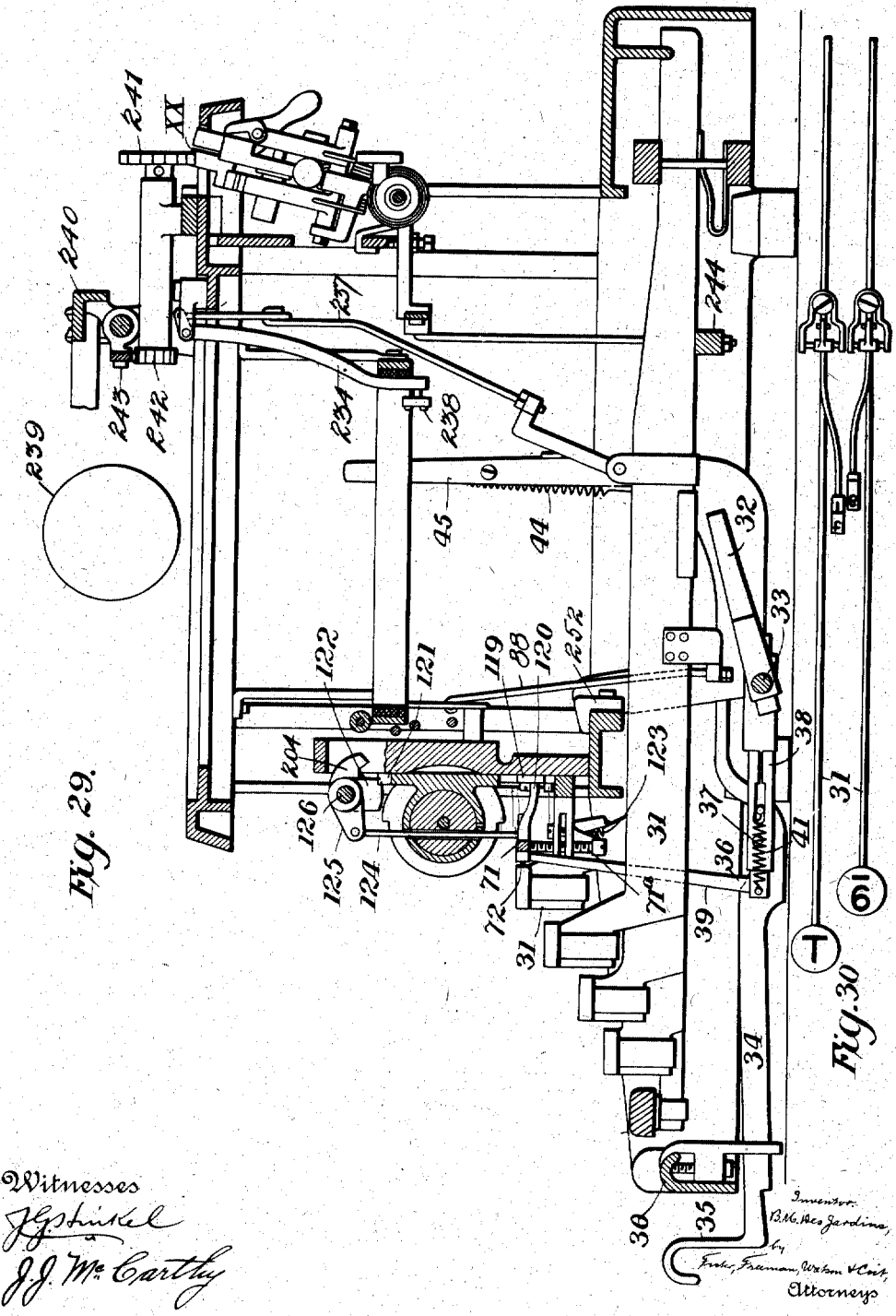

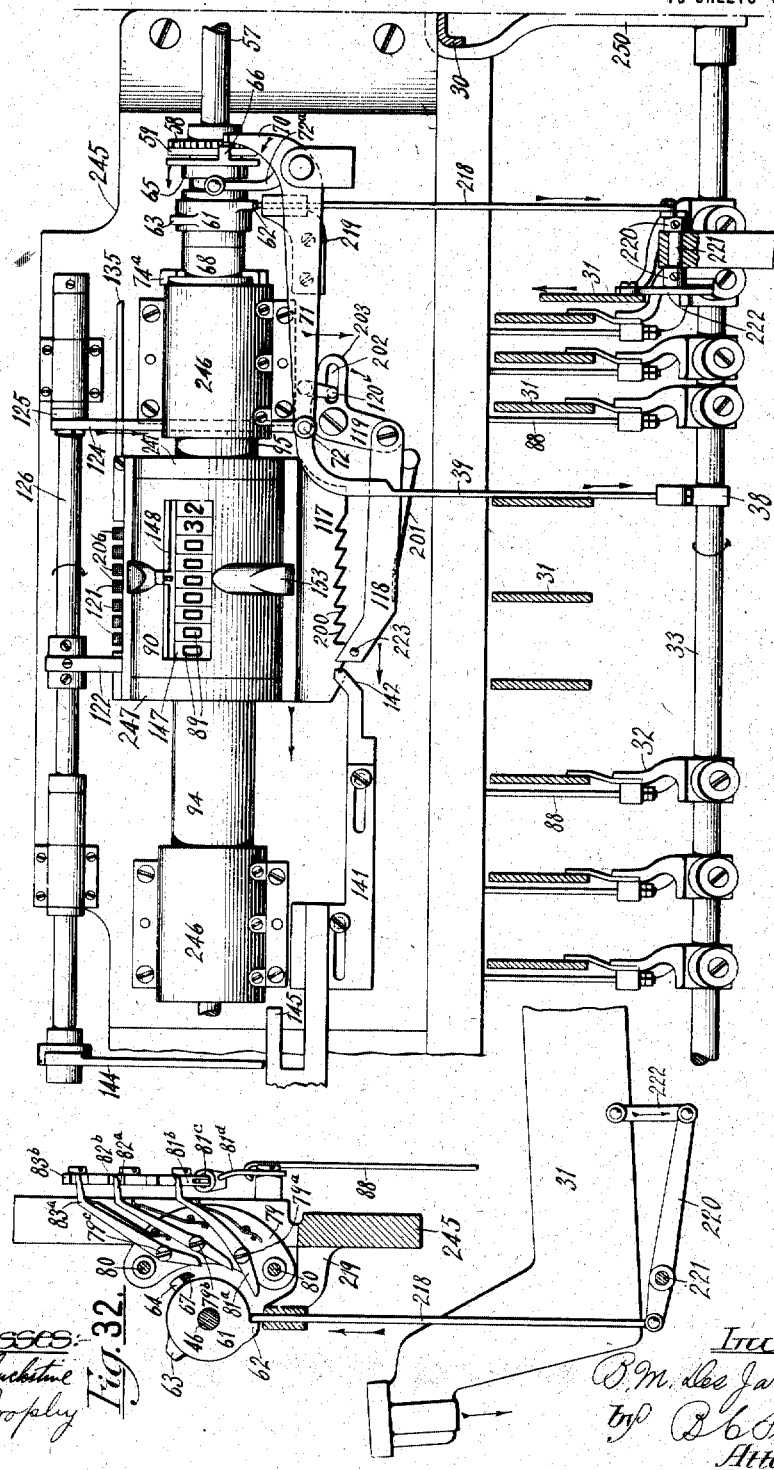

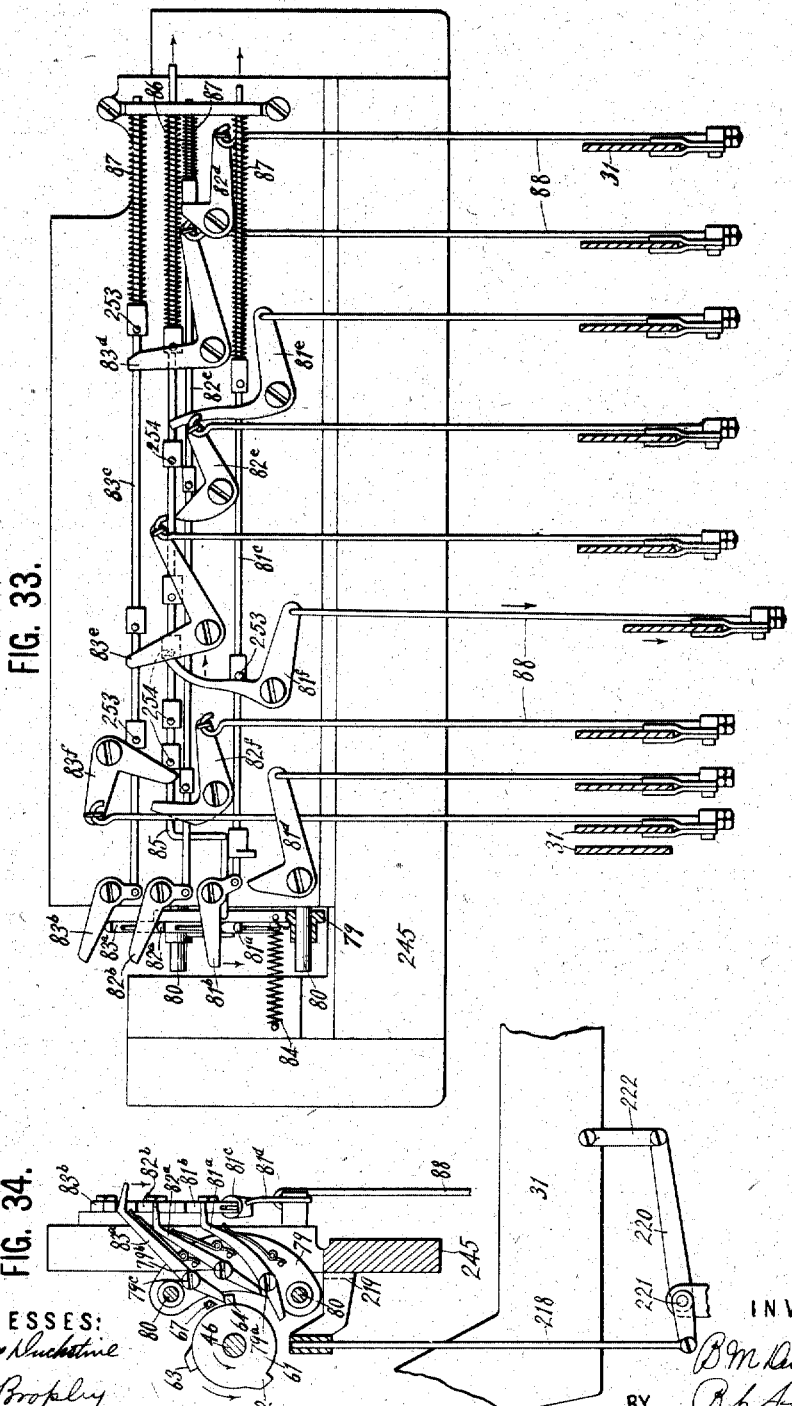

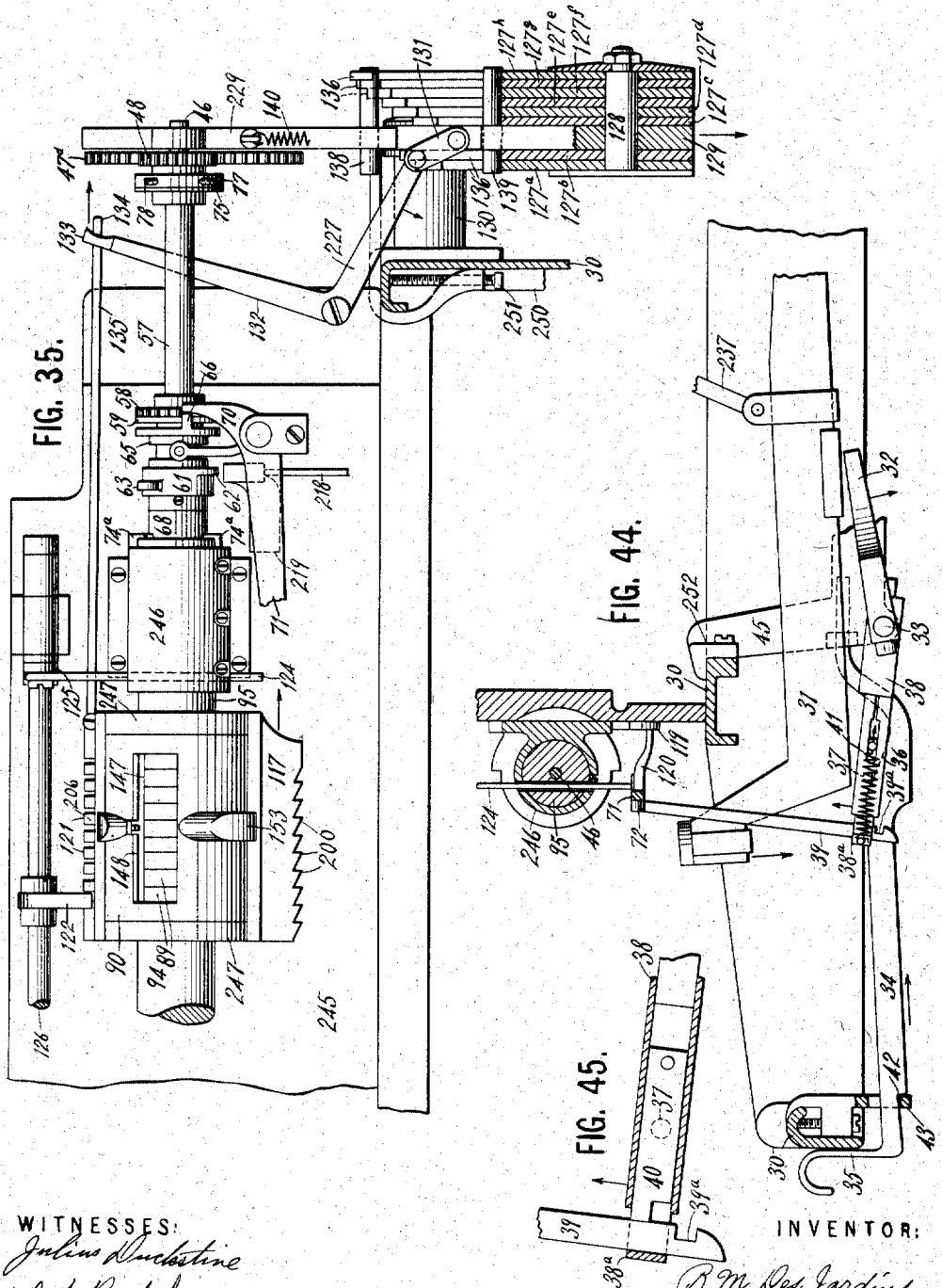

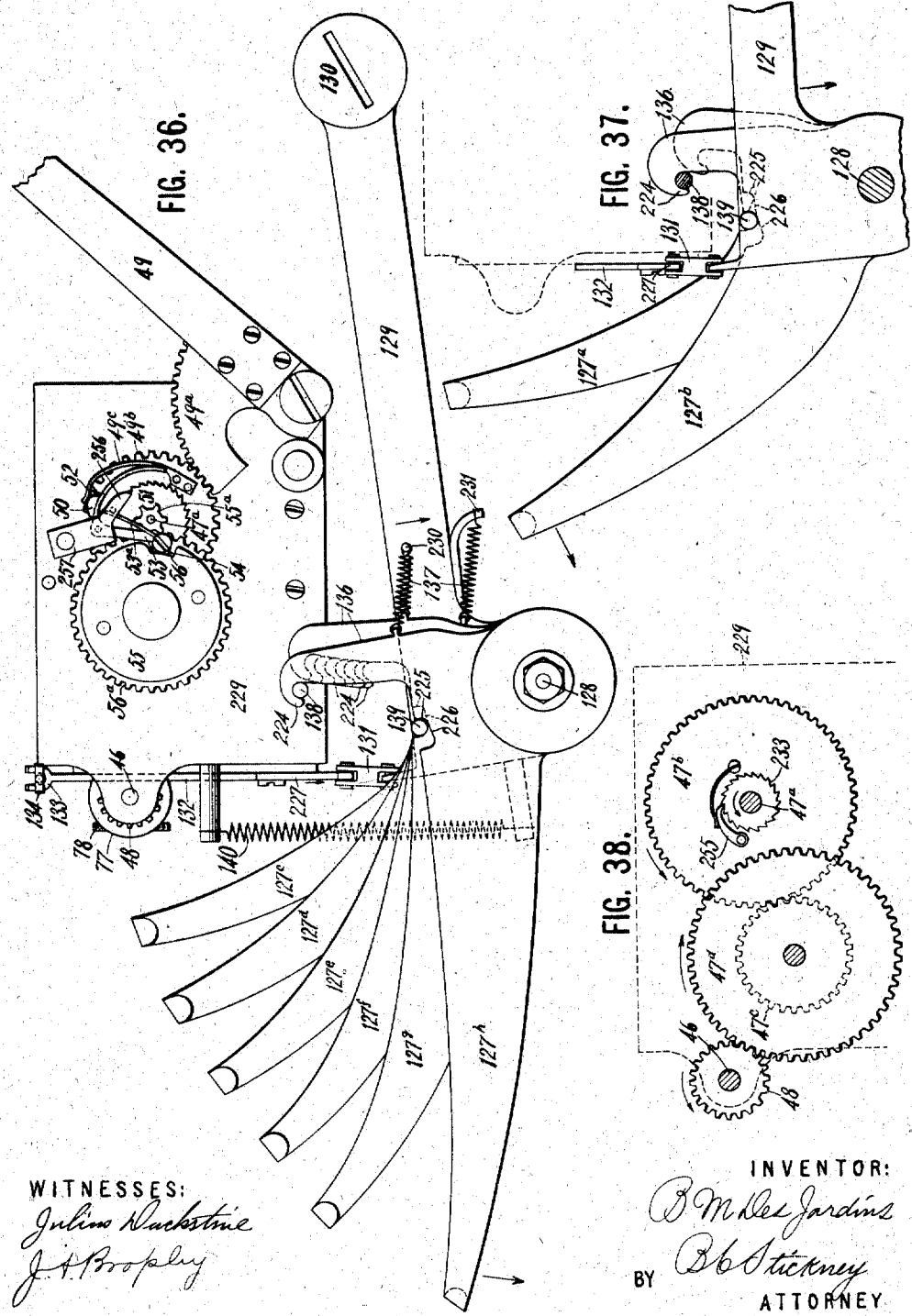

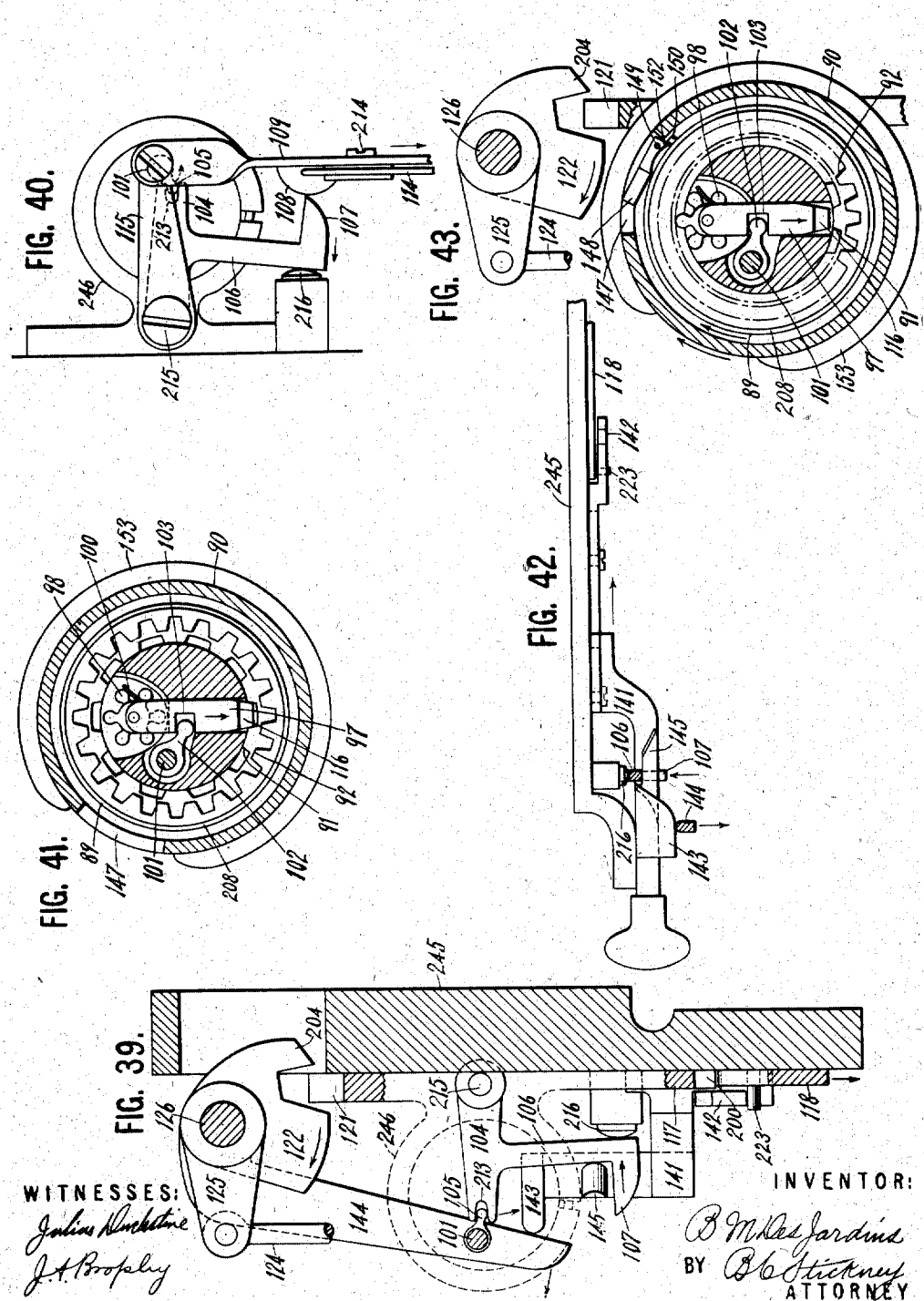

UNITED STATES PATENT OFFICE.

BENJAMIN M. DES JARDINS, OF WEST HARTFORD, CONNECTICUT, ASSIGNOR, BY MESNE ASSIGNMENTS, TO JOHN T. UNDERWOOD, OF BROOKLYN, NEW YORK.

COMPUTING ATTACHMENT FOR TYPE-WRITERS.

1,302,464.      Specification of Letters Patent.      Patented Apr. 29, 1919.

Application filed April 27, 1904, Serial No. 205,306. Renewed November 12, 1912. Serial No. 731,012.

*To all whom it may concern:*

Be it known that I, BENJAMIN M. DES JARDINS, a citizen of the United States, residing at West Hartford, in the county of Hartford and State of Connecticut, have invented certain new and useful Improvements in Computing Attachments for Type-Writers, of which the following is a specification.

This invention relates to combined typewriting and computing machines, and has for its object to render such combined machines easily applied to standard typewriting machines, and to render such combined machines simple and accurate in their operation.

The numeral keys of standard typewriting machines may be arranged to turn numeral or computing wheels *seriatim*, to extents determined by the numeral keys operated. This *seriatim* turning I accomplish through a master wheel, which is constantly under torque from an outside source of power.

At every operation of a numeral key, I couple the master wheel to an indexing wheel which permits it to be rotated to an extent dependent upon the numeral key operated, and then positively arrests it. Said indexing wheel may coöperate with key-controlled dogs which may be moved into the path of the selected index on said wheel, and thus arrest said wheel at the desired point.

Another important feature of my invention resides in the provision of means whereby the indexing wheel may be made with a less number of indexes than there are numeral keys, and there may be a correspondingly less number of key-operated dogs, so arranged that each dog coöperates with any of the indexes on said wheel. For this purpose the indexes on said wheel may be set in different planes on said wheel, and the key-operated dogs may be carried on a mount which is bodily movable, so as to bring all the dogs on said mount into the plane of any one index on the wheel. In this way room is obtained for making the indexes and dogs larger or for avoiding too compact and light construction of the various parts, and other advantages are gained.

Another feature of the invention resides in the provision whereby each numeral wheel may be normally in mesh with an internal carry-over wheel, which carry-over wheel forms a Geneva lock with the inner periphery of the numeral wheel next lower in denomination, so that unless said carry-over wheel is being positively turned by said lower numeral wheel, it is held positively locked thereby. Means may be provided for moving the carry-over wheels out of mesh with the numeral wheels and for simultaneously locking said numeral wheels. This may be accomplished by having the carry-over wheels journaled in a slide, the lower edge of which slide may be moved to mesh between teeth formed on the internal surface of said numeral wheels.

Still another feature is a zero-setting mechanism; and for this purpose the carry-over wheels may be moved out of mesh with the numeral wheels and yet be held in such position that the numeral wheels are not locked by the above-mentioned plate. For being thus set by the zero-setting mechanism, each of the numeral wheels may have a pin on its periphery which lies in the path of a bar, which is adapted to be moved adjacent to the surface of said numeral wheels and then swing around them and thus turn them. For thus swinging said bar, the casing in which said numeral wheels are revoluble may be itself rotatable, and said bar may be pivoted on said casing.

Other features of invention are shown, and will now be briefly outlined:

The *seriatim* engagement of the master wheel with the numeral wheels may be brought about by having the numeral wheels mounted in a transversely feeding totalizer, and this totalizer may be held locked against movement during the time said master wheel is rotating in one of said numeral wheels. The transverse feed of said totalizer may be positively brought about by a pawl operated by each numeral key, and the locking of said totalizer may be brought about by a tooth which is swung between the teeth of a rack fast on said totalizer, with every operation of a numeral key. Said locking tooth may have fast to it another tooth, which is arranged to coöperate with said force-feeding pawl to positively aline said totalizer after it is moved by said pawl.

The numeral keys may operate the computing mechanism by means of bars which underlie the levers of said key, and said bars may be arranged to be moved out of engagement with the numeral key levers whenever it is desired to use the typewriter independent of the computing mechanism.

The computing mechanism may include a series of tabulating handles, which are arranged to move the totalizer transversely of the machine so as to bring the master wheel into engagement with any selected numeral wheel, thus shifting the computing mechanism to register in any predetermined denomination. The carry-over wheels, for this shifting, may be moved out of engagement with the numeral wheels, and the escapement and driving parts for feeding the totalizer casings may be likewise moved to ineffective position, and for so moving the wheels and rendering said escapement ineffective, there may be a single hand-operated slide which is arranged to thus position them.

Other features and advantages will hereinafter appear.

In the accompanying drawings,

Fig. 2 is a front elevation of the adding mechanism as applied to a typewriter, the figure key levers and a part of the typewriter being shown in section.

Fig. 3 is a section about on the line 2—2 of Fig. 2.

Fig. 3ª is a detail.

Fig. 4 is a bottom plan view of the figure key levers and their connections to the adding mechanism, the figured ends being shown broken off and turned.

Fig. 5 is a rear view of the adding mechanism showing the connections from the key levers for operating the variable stops.

Fig. 6 is a left end view of parts shown in Fig. 5.

Fig. 7 is a right end view, and Fig. 8 a plan view showing the winding mechanism and the levers for setting the adding mechanism according to the denomination of the first figure in the number to be added.

Fig. 9 is a longitudinal sectional view of the variable escapement devices.

Fig. 10 is a front view of part of Fig. 9.

Fig. 11 is an end view of the escapement shaft showing an adjusting device.

Fig. 12 is a section on the line 12 of Fig. 9.

Figs. 13 and 14 are side and edge views of the escapement stop.

Fig. 15 is a section on the line 15 of Fig. 9 showing the escapement return spring.

Fig. 16 is a section on the line 16 of Fig. 9 showing the escapement cushioning spring.

Figure 17:
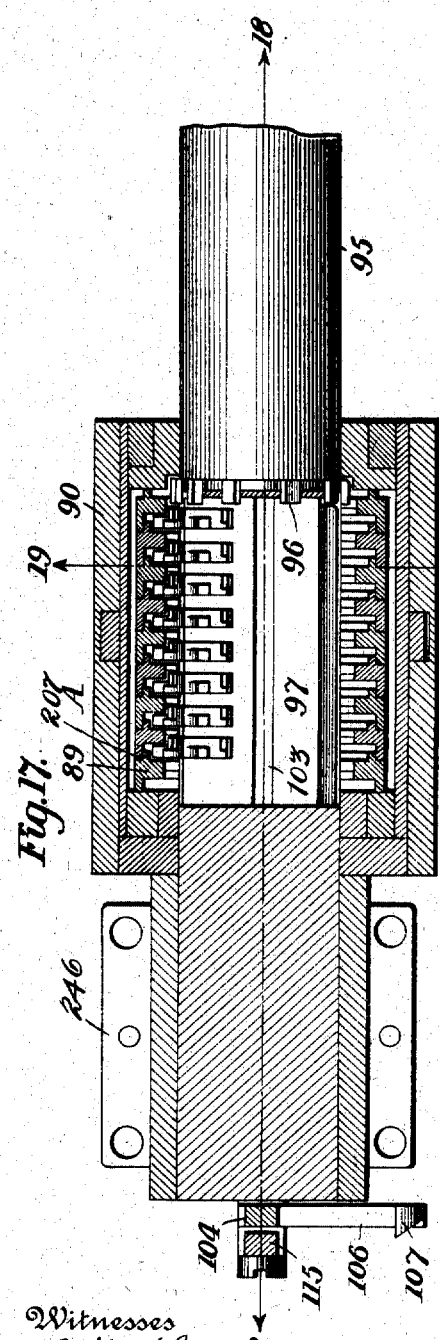

Fig. 17 is an enlarged longitudinal sectional view of the register wheels and carrying devices.

Figure 18:
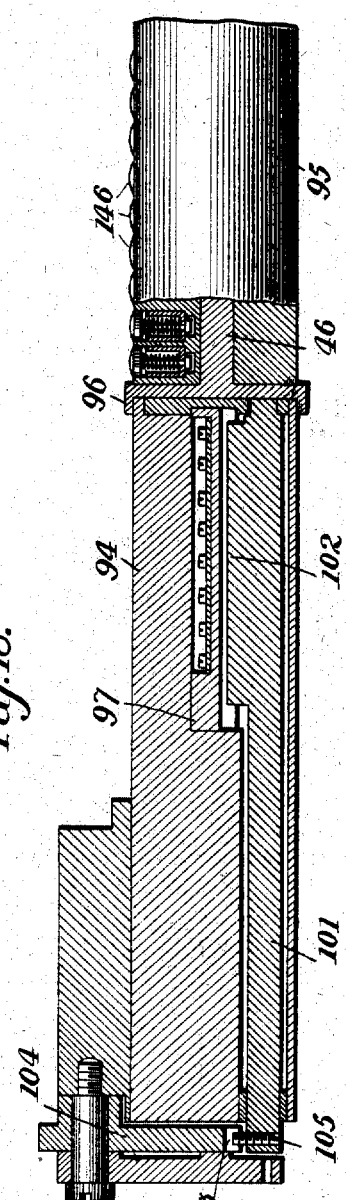

Fig. 18 is a section on the line 18 of Fig. 17.

Fig. 19 is a section on the line 19 of Fig. 17.

Fig. 20 is a left-hand view of the register.

Figs. 21 and 22 are details of the register wheels.

Fig. 23 is a side view of the carrying wheels and the slide upon which they are mounted.

Fig. 24 is a section on the line 24 of Fig. 23.

Fig. 25 is a section on the line 25 of Fig. 22.

Figure 1:
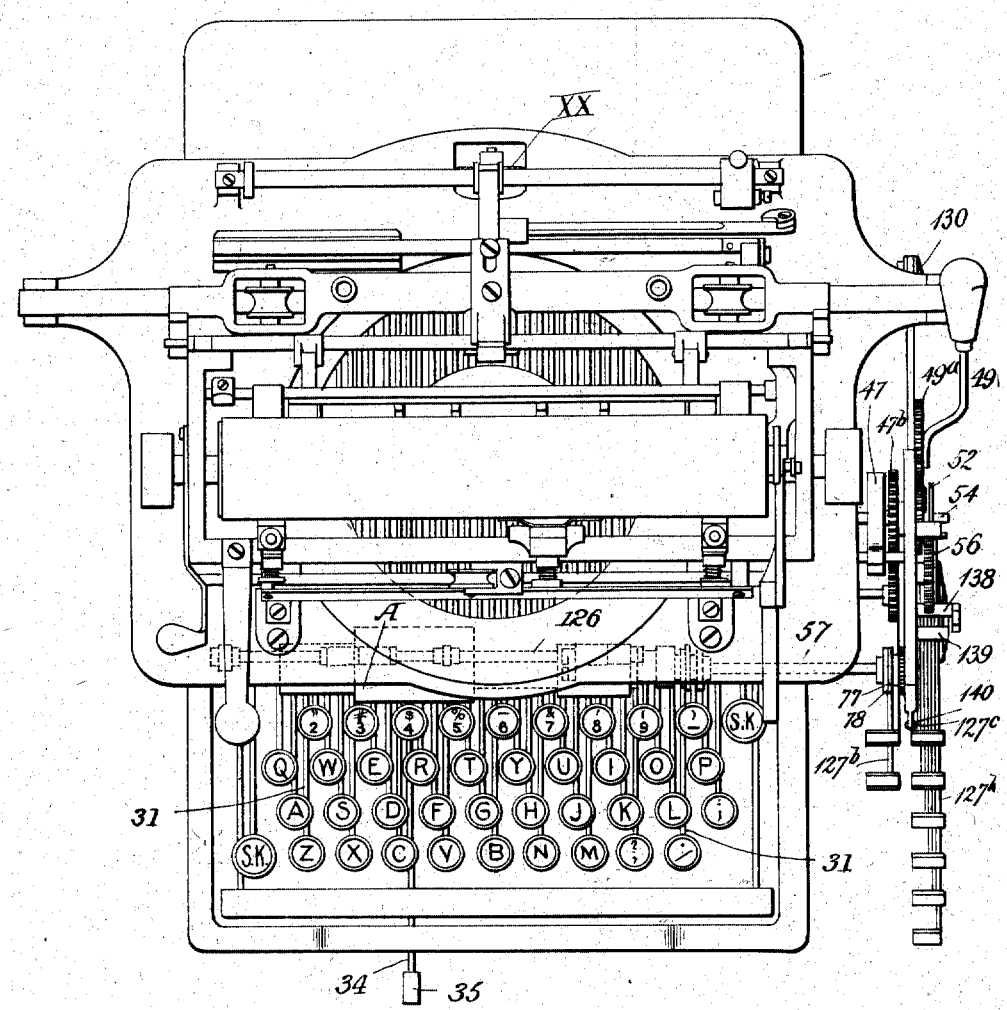
Figure 1 is a plan view of a Remington typewriting machine showing a computing attachment combined therewith.

Fig. 26 is a section on the line 26 of Fig. 1.

Fig. 27 is a detail.

Fig. 28 is a perspective of the hand-operated slide.

Fig. 29 is a vertical section through the machine.

Fig. 30 is a plan of two of the keys of the machine and the type bars connected therewith.

Fig. 31 is a view similar to Fig. 2, but showing the zero key connection.

Fig. 32 is a view similar to Fig. 6, but showing the zero key connection.

Fig. 33 is a view similar to Fig. 5, but showing the "7" key operating its stop.

Fig. 34 is a view similar to Fig. 32, but showing the stop-carrying member arrested by the "9" key.

Fig. 35 shows the details of the connection between the tabulating mechanism and the totalizer.

Fig. 36 shows part of the winding mechanism and the tabulating mechanism.

Fig. 37 shows another part of the tabulating mechanism.

Fig. 38 shows details of the driving mechanism.

Fig. 39 is a detail cross section showing the parts as set when the totalizer is to be moved by the tabulating keys.

Fig. 40 shows the connections for swinging the carry-over wheels during a transverse feed of the totalizer.

Fig. 41 is a cross section viewed from the right of the totalizer in the position seen in Fig. 40.

Fig. 42 is a plan view of the releasing slide shown in Fig. 28.

Fig. 43 is a section through the totalizer when the parts are set as in Fig. 39.

Fig. 44 is a section showing the arms to connect the numeral keys to the escapement mechanism.

Fig. 45 is a detail of Fig. 44.

The invention is herein disclosed as applied to a Remington typewriting machine, in which alphabet and numeral-key levers 31, when depressed, swing type-bars 234 upwardly by links 237, so as to cause type 238 to strike beneath a platen 239. Said platen, as usual, is mounted in a carriage 240 which is drawn forward in letter-feeding direction by a spring barrel, not shown, and is controlled in said letter-feeding by means of an escapement wheel 241 to the shaft of which wheel is fast a pinion 242 working in a rack 243 pivoted on the frame of the typewriter carriage.

The escapement wheel 241 is controlled from the key-levers 31 by means of a universal bar 244 underlying said bars and arranged to operate escapement dogs X X working in the teeth of said escapement wheel. The computing mechanism comprises a totalizer casing 90, which carries within it computing or numeral wheels 89, which are arranged to engage *seriatim* a master wheel 96, which in a manner hereinafter described, is constantly under torque tending to turn it, and is controlled in said turning by the numeral keys.

Said totalizer, in its *seriatim* movement, slides transversely of the typewriter frame, and is supported thereon by a plate 245 screwed to the front posts of the frame of said machine. The members on which the totalizer slides are two cores 94 and 95, one of them on each side of the master wheel and each supported in its bracket 246, which brackets are screwed to the plate 245 aforesaid.

The master wheel 96 engages the numeral wheels of the totalizer internally, and as will be seen from Fig. 17, comprises a flange having peripheral teeth which overlie the core 94, and is fast on a master wheel shaft 46 extending through the core 95.

Under each numeral key-lever 31 of the typewriting machine, a rearwardly extending arm 32 can be so placed as to be intercepted by said key-lever whenever the key is depressed. These arms 32 regulate the escapement which causes the *seriatim* engagement of the master wheel with the computing wheels.

The numeral key 31 in carrying down the arm 32 with it, turns a rock shaft 33 to which all the arms 32 are fast so as to rock said arm against the tension of a spring 44 drawing on one of the arms 32, which spring is anchored (see Fig. 29) in a vertical post 45 fastened at 252 to the front of the typewriter frame, said spring arranged to hold said arms up against the numeral keys. Said rock shaft 33 is journaled in brackets 250 (see Fig. 2) which hook over the sides 30 of the typewriter frame and are secured thereto by set screws 251 bearing against overhanging flanges in said side bars. In so rocking said shaft 33, a forwardly extending arm 38 fast on said rock shaft raises a link 39 (see Figs. 3 and 44) extending upwardly so as to rock a bell crank lever 71, the upwardly extending arm 70 of which forms a stop which (see Figs. 2, 31 and 35) normally holds or locks said master wheel shaft 46 against rotation. Said arm 70 is normally held in holding position by a spring 123, and a set screw 71ª limits its throw. In thus rocking, the bell-crank arm 70 swings clear of the stop wheel 58 by which it normally holds said shaft 46 against rotation, and at the same moment shifts into mesh between the teeth of said stop wheel 58, a clutching slide 65 comprising two teeth 66 which are arranged to mesh with the teeth of said stop wheel 58 (see Figs. 9 and 10). Said clutching slide then turns with said shaft 46, as the shaft is turned by the spring 47, but in so turning carries with it a stop or index wheel 61. Said index wheel 61 and the shaft 46 turn together until arrested by (see Fig. 6) one of the indexes 62, 63 or 64 thereon, which strikes one of a series of key-operated stops or dogs 81ª, 82ª, 83ª, arranged in a manner hereinafter described, and seen in Fig. 34, to lie in the path of one of said indexes.

In this way, at the depression of a numeral key, the shaft 46 can be rotated by the motor until arrested by a dog set by the numeral key operated. Said index wheel 61 is formed as a sleeve loose on the shaft 46 and is normally held by a spring 69 so that a projection 67 on the frame of the computing machine, seen at Fig. 14, holds said index wheel arrested by bringing the index 64 of said wheel against the projection 67, as seen in Fig. 32. As said spring 69 is comparatively light it offers little resistance to the turning of the shaft 46 by the motor. It will be seen that every time the clutching slide 65 is freed from the stop wheel 58, said spring 69 will revolve said index wheel 61 together with said clutch slide to its normal position of rest. The shifting clutch member 65 is free to slide on said index wheel, but always turns therewith, since, as seen in Fig. 9, it is formed as a sleeve loose on an extension 60 of the index wheel 61 and carries stops 66, which project through slots in a flange 59 fast on said index wheel 61.

For breaking the shock of arresting the stop carrying member 61 when it is returned by the spring 69 against the projection 67 on the member 68, said member 68 is fastened on its core 95 in such a way that it gives to a slight extent. For this purpose, said member 68 is formed, as shown in Fig. 13, with two openings through which blocks 74ª may project, said blocks comprising flanges which overlap the flanges 68ª on the member 68, as seen in Fig. 15, so that screws may pass through said block 74ª and hold the members 68ª against the core 95. Thus said block 74ª permits a slight rotation of the member 68. The lower member 74ª, as seen in Fig. 16, has a notch receiving one end of a stiff flat spring 73, lying within a channel in the member 68, the opposite end of which spring bears against the end of a flange 68ª on the member 68, so that the member 68 may have a slight movement against the tension of said spring within the limits of travel permitted by the blocks 74ª.

The master wheel 96 is formed solid with the shaft 46 and the stop wheel 58 is attached thereto by means of a tongue 76 (see Fig. 9) formed on a flange extension 75 of the sleeve 57 forming the hub of the stop wheel 58. For adjusting the stop wheel 58, the tongue 76 extends through an opening in a flange 77 formed on the master wheel shaft 46 and is engaged on each side by set screws 78 threaded into said flange 77.

The key-operated dogs $81^a$, $82^a$, $83^a$, (see Figs. 32 and 34) are formed as levers pivoted at $79^a$, $79^b$, $79^c$, and the nose of each of said dogs may be swung into the path of the right-hand index 62 by its rearward end, which underlies one arm of a bell-crank $81^b$, $82^b$, $83^b$. Said bell crank $83^b$ is operated from its numeral key-lever 31 by means (see Figs. 5 and 33) of a slide-rod $83^c$ pivoted to said bell crank and extending transversely of the machine. This slide-rod $83^c$ is drawn from the numeral key-lever 31 by means of the bell crank $83^d$, which strikes a pin 253 fast on said slide-rod $83^c$, and is connected to said numeral key-lever by means of a pivoted link 88 depending from said bell crank and attached to a yoke fast to said numeral key-lever.

The plate 79 carrying the dogs $81^a$, $82^a$ $83^a$, normally holds said dogs alined with index 62 on the index wheel 61, and in this position when the "1", "2", or "3" numeral keys are operated, the appropriate dog $81^a$, $82^a$, or $83^a$ will be swung outwardly so as to arrest the index wheel 61 according to the key operated. For the other numeral keys the plate 79 is arranged to be shiftable so as to move the dogs $81^a$, $82^a$ and $83^a$, into the path of the index wheel indexes 63 and 64, according to the number which it is desired to compute; that is to say, the index 62 is used when it is desired to rotate the master wheel three-tenths of a revolution or less; the index 63 is used when it is desired to rotate the master wheel more than three-tenths of a revolution, but not over six-tenths of a revolution; and the index 64 is used when it is desired to rotate the master wheel seven, eight or nine-tenths of a revolution; and the selection of the index 62, 63 or 64 depends entirely on the one of said indexes which the plate 79 causes the dogs $81^a$, $82^a$ and $83^a$ to aline.

For shifting said plate 79, a shift-bar 85 fast thereon carries pins 254 which are arranged to be intercepted as seen in Figs. 5 and 33, by the bell cranks $81^f$, $81^e$, etc. The amount of shifting of said plate 79 depends on the distance from the pivots of said bell cranks to each pin on the bar 85. Said plate 79 is normally drawn to the left, as viewed from behind, by means of a spring 84 fast thereto, assisted by a spring 86 encircling said shift-bar 85.

For example, when the numeral key 7, as seen in Fig. 33, is depressed, its bell crank $81^f$, which corresponds to the bell crank $83^d$, above described, will engage a pin 254 fast on the slide bar 85, fast to said plate 79. This will move the plate 79 to the right, as seen in Fig. 33, so that said plate brings the dogs $83^a$, $82$ and $81^a$ into the path of the index 64 and at the same time said bell crank $81^f$ strikes a pin 253 on the slide bar $81^c$ so as to swing the dog $81^a$ outward into the path of the index 64 and thereby arrest the master wheel shaft 46. Thus at the same time that the numeral key 31, by means of its underlying lever, is releasing the escapement dog 70 holding the master wheel shaft, the key-lever is setting the appropriate dog to arrest said shaft when it is rotated the proper number of units.

The *seriatim* engagement of the master wheel 96 fast on the shaft 46 with the numeral wheels 89 is brought about by a transverse feed of the casing 90 containing said numeral wheels. Said casing is fed to the left on the up-stroke of every numeral key during which stroke the master wheel 96 does not rotate, its rotation having taken place, as described above, on the downward stroke of the numeral key. For so moving said casing 90 there is fast (see Figs. 2 and 31) on its lower edge a rack bar 117 comprising teeth 200, which teeth on the rising stroke of the numeral key are arranged to be engaged by a pawl 118 pressed upwardly against them by means of a spring 201, said pawl being operated from the lever 71 by an arm 120 extending rearwardly from said lever and working in a slot 202 in one arm 203 of a bell crank lever 119 on which said pawl 118 is pivoted. On the down-stroke of the numeral key, the link 39 draws said pawl 118 to the right, so that it engages with the tooth next to the right of the one which was previously engaged, and then on the upward stroke of the key by said tooth, the computing casing 90 is positively fed to the left by the spring 44, which rocks the shaft 33 to its normal position.

Said computing casing is normally held against accidental transverse movement by means of a locking tooth (see Figs. 3, 29 and 39) 122 lying between teeth 121 forming a rack on the upper edge of said casing 90. With every depression of a numeral key, said locking tooth 122 is swung free of the teeth 121 by the shaft 126 to which it is fast, said shaft being swung by a link 124 pivoted to the link 39 at 72 and to a rock arm 125 fast on the shaft 126. Later in the depression of the numeral key a second tooth 204, likewise fast on the rock shaft 126, swings almost instantly into mesh with said teeth 121 so that the computing casing 90 is practically held locked against accidental movement during the whole depression of the numeral key. During said depression, as has been described above, the master wheel 96 has been turned. At the return stroke of the numeral key, the tooth 204 moves out of teeth 121 and the pawl 118 engaging the lower rack 117 begins to move the totalizer casing to the left. The feeding of said casing 90 is completed by said pawl 118 working in conjunction with a bevel face 205 (see Fig. 26) of the tooth 122 which face, as said tooth returns, engages a corresponding face 206 on one of said teeth 121, so that the continued movement of the tooth 122 will positively feed forward said casing 90 by its entry between the teeth 121. Thus it will be seen that the casing 90 containing the computing wheels is held locked during practically the whole of the time when it is not actually being fed transversely.

The numeral wheels (see Figs. 17, 19, 21, 22, 25, 41 and 43) 89 in said casing 90 each comprise internal teeth 91, which are ten in number corresponding to the teeth of the master wheel so that said master wheel can slide from engagement with one numeral wheel into engagement with the next when said teeth are properly alined. Said numeral wheels 89 bear numerals on their outer periphery. Said numeral wheels 89 each comprise a peripheral flange 207 which surrounds a flange 208 of slightly smaller diameter on the adjoining numeral wheel higher in denomination, so that said numeral wheels are supported from one another by said flanges.

Each of said numeral wheels likewise comprises an internal gear 92 lying entirely outside the teeth 91 with which the master wheel is arranged to engage, and said gear 92 is normally in mesh with a small six-toothed carry-over wheel arranged to turn said numeral wheel one unit every time the numeral wheel next lower in denomination turns so as to read zero. Thus said six-toothed wheels form carry-over units. The alternate teeth of said carry-over wheels, as seen in Figs. 23 and 24, are extended axially so as to form broader teeth, which normally hold said wheels locked by bearing against a flat internal peripheral surface 209 on the numeral wheel next lower in denomination. Once in each revolution of said lower numeral wheel, a tooth 93 on said lower wheel, which is formed as an axial extension of said surface 209, strikes the short tooth 98 between two of the broad teeth 210 of said carry-over wheel, which tooth 98 has been riding along the edge 211 of the peripheral surface 209. The tooth 93 in striking said carry-over wheel turns it and thereby turns the adjacent computing wheel having its gear 92 in mesh with said carry-over wheel. Said turning is permitted by having the peripheral surface 209 cut away, as seen at 212, so as to permit the broad teeth 210 to sink in said cut-away portion beyond said peripheral surface. A second tooth 93 on the other side of said cut-away portion 212 completes the turning of said carry-over wheel and through it the turning of the adjacent computing wheel. From this it will be seen that the carry-over wheels 98 by means of their teeth riding on the peripheral surface 209 hold the computing wheels with which they are in mesh locked in each case from the computing wheel next lower in denomination.

In order to permit the totalizer casing 90 to be fed transversely, as above described, the carry-over wheels are positively moved out of mesh (see Fig. 41) with their respective numeral wheels at the moment said casing is moved transversely, that is to say, on the upward stroke of a numeral key. For accomplishing this, the carry-over wheels are journaled in a frame 97 (see Figs. 18, 17, 41 and 43), which is bodily moved downward to move the carry-over wheels away from the numeral wheels while the casing 90 is moved to the left. This is brought about (see Figs. 2 and 40) by a rock shaft 101, having a rock arm 102 extending into a slot 103 on said frame 97, and said rock shaft 101 includes a pin 105 extending into a slot 213 in a rock arm 104, which rock arm is cammed downwardly during the upward stroke of a numeral key by means of a link 109 connected to a forwardly extending arm 112 fast on the shaft 33. The connections between the link 109 and the arm 112 on shaft 33 include a lever 110 pivoted at 111 on a bracket fast on the journal of the shaft 33 which lever 110 is pivoted to the link 109 and is operated from said arm 112 by a pin 260 adjustably mounted in a slot in said arm and riding in a slot in the lever 110. For thus camming said rock arm 104, a cam (see Figs. 20 and 40) 108 pivoted on the link 109 at 214 is arranged on the downward movement of said link 109 to strike an outwardly extending arm 107 formed on a depending branch of the rock arm 104, so as to swing said rock arm 104 around its pivot 215. Said depending arm 106 is normally held upward by means of a spring 113 bearing against said arm by means of a cap 216. During the downward stroke of the numeral key, which is the upward stroke of the link 109, the cam 108 swings idly on its pivot 214 past the outwardly extending arm 107, and is swung back into the path of said arm 107 by means of a spring 114 bearing against the cam member 108.

From this it will be seen that the carry-over wheels are in mesh with the numeral wheels except for a brief moment during the upward stroke of the numeral key and, therefore, the numeral wheels are held locked except during said brief moment. When said downward movement of the carry-over wheels 98 takes place, the lower end 116 of the frame 97 carrying them enters between the teeth 91 (see Fig. 41) of the numeral wheels and so holds said wheels locked during the time when said carry-over wheels are out of mesh with said numeral wheels, and since the teeth 91 are held alined for the master wheel to slide through them, they likewise will be alined for the lower edge 116 of the frame to slide through them. Thus said frame holds said wheels locked during the transverse feeding of the totalizer casing. Each carry-over wheel is held against jarring out of meshing position when clear of the numeral wheels by means of a spring 100 (see Fig. 24) which bears against two teeth on said wheel, and thus forms a spring detent for holding the carry-over wheel positively alined. Said springs 100 are formed as extensions of a resilient plate 217 screwed onto the frame 97.

The above described parts hold all the numeral wheels to the left of the master wheel locked. The numeral wheels to the right of the master wheel are held against accidental displacement by a series of headed pins 146 (see Fig. 18) lying in sockets in the core 95 and pressed upward by springs, thus forming detents which enter between the teeth 91 of the numeral wheels 89.

The transverse feeding of the totalizer casing 90 is brought about through the rock shaft 33, as above described, by all the numeral keys including the zero key. In order to prevent the master wheel from turning while the zero key is depressed, a special stop 218 (see Fig. 34) sliding in a guide post 219 on the frame of the machine, is arranged to be moved upward into the path of index 62 on the inlex wheel 61 every time said zero key is depressed. The connections between said stop 218 and the zero key include a lever 220 pivoted on the frame at 221 and pivotally attached to said zero key-lever 31 by means of a link 222 also pivoted on said zero key-lever.

Preparatory to drawing the totalizer casing 90 to the right, at the beginning of a new line, means are provided for moving the pawl 118 and the tooth 122 out of mesh with the teeth 200 and 121 respectively, and at the same time moving the carry-over wheels so that they will be out of the path of numeral wheels 89 during the sliding of said casing. This releasing of the parts is accomplished by means of a releasing slide 141 (see Figs. 2, 28 and 42) comprising a cam point 142 arranged to cam the pawl 118 clear of the teeth 200 by striking a pin 223 so as to swing said pawl downward against the tension of spring 201 while, at the same time, a horizontal cam 143 on said slide strikes a downwardly projecting arm 144 fast on the rock shaft 126, which carries the teeth 122 and 204. Said horizontal cam 143 swings said rock shaft 126 so that the teeth 121 are between the two teeth 122 and 204 on said rock shaft, and thus the releasing slide frees the casing 90 from the control of the feeding mechanism. At the same time, the cam 145 on said releasing slide swings the rock arm 104 by means of its depending arm 106 so as to move the carry-over wheels 98 part way downward, as seen in Fig. 43, in which position the numeral wheels are not locked by either said carry-over wheels or by the edge 116 of the carry-over frame 97. With the parts thus positioned, the totalizer casing may be set at any desired position in its travel.

A tabulating mechanism is provided for automatically positioning said totalizer casing, so that the master wheel will be set in mesh with the numeral wheel of any selected denomination. Said tabulating mechanism comprises a series of handles $127^a$, $127^b$, etc., shown in Figs. 7, 8, 36, and 37, each bearing the denomination of the wheel with which it is desired to make the master wheel engage. Thus the tabulating handle for moving the computing wheels to cause the master wheel to mesh with the tens wheel in marked "Tens"; the wheel for the hundreds wheel "Hundreds," etc. Said handles are pivoted at 128 on an idle arm 129 journaled in the frame of the machine on an arm 130. Whenever one of said handles is depressed, an upstanding arm 136 forming an extension of said handle is swung forward against the tension of a spring 137 so that a hook 224 on the end of said upstanding arm 136 will be intercepted by a fixed pin 138, thereby limiting the throw of said handle. As said handle 127 is moved downwardly, it will swing its upstanding arm 136 forward until the upstanding arm either hits the pin 138, or else a rear wall 225 of a notch 226 on said arm will strike a pin 139 fast in the swinging arm 129. The handle 127 in thus moving downward draws idle arm 129 downward. As the idle arm thus moves downward it will draw the totalizer casing 90 to the right by means of a rod 135 pivoted on said casing, which rod said idle arm 129 draws by means of a bell crank 132 having an arm 227 which is pivotally joined by a link 131 to said idle arm. When said idle arm is released it is drawn upward again in normal position by means of a spring 140. It should be observed that, before thus attempting to position the totalizer casing, the releasing slide 141 should be operated so as to free said casing from the feeding mechanism.

It will be noted that there are eight tabulating handles 127, numbered from $127^a$ to $127^h$ respectively, and that two of these lie to the left of the idle arm 129, while six lie to the right of said idle arm and that said idle arm has its plane of movement directly in line of and beneath the plate 229, which forms the right-hand end of the computing mechanism and carries the journals for the driving parts thereof.

The springs 137, it will be noted, are in staggered arrangement being alternately placed so as to anchor in pins 230 near the top of said idle arm 129 or projecting arms 231, below said idle arm 129, and said springs draw the arms 127 upward till arrested by the pin 139. The hooks 224 of the various upstanding arms 136 are arranged at such distances, that the throw of the idle arm 129 will draw the link 135 to move the totalizer casing just the right amount so as to exactly mesh the master wheel in each case with the proper computing wheel. The pins 138 and 139, it will be observed, extend on both sides of the idle arm 129 so as to engage with the arms on both sides of said idle arm.

The master wheel, as has been described, is constantly under torque tending to turn it, and said torque is furnished by a spring 47. Said spring is anchored to a pin 232 fast on the plate 229, and its opposite end is fastened to shaft 47$^a$. A driving ratchet 233 fast on the shaft 47$^a$ (see Fig. 38) is engaged by a spring-pressed pawl 255 pivoted on the gear wheel 47$^b$, which gear wheel meshes with a small gear 47$^c$ fast to a large gear 47$^d$ which last-mentioned gear meshes with a gear 48 fast on the shaft 46 of the master wheel. Through this gearing the spring 47 drives said master wheel shaft. Said spring may be wound by means of a handle 49 having fast to it a segment gear 49$^a$ which meshes with gear wheel 49$^b$ loose on the driving shaft 47$^a$ to which the spring 47 is attached. Said loose gear wheel 49$^b$ carries a pawl 50 arranged to engage with a ratchet wheel 51 fast on said shaft 47$^a$, which pawl is pressed by a spring 49$^c$ against said ratchet wheel so that by operation of the handle 49 said ratchet wheel, may be driven to wind up said spring. Said pawl is normally raised out of the teeth of said ratchet wheel by riding up on the nose 256 of the plate 257, see Fig. 7.

Means are provided for making it impossible to wind up the spring too tight. This is accomplished by means of an arm 52 (see Figs. 7 and 36) pivoted in the plate 257 forming a cam surface which, when said spring is wholly wound up, is swung so as to lie within a side projection of said pawl 50, and by said projection, cam said pawl out of engagement with the ratchet wheel 51, so that the handle 49 will move idly.

For thus swinging the arm 52, a control wheel 56$^a$ meshes with a pinion 55$^a$ fast on the driving shaft 47$^a$ and carries a control plate 55. Said control plate is arranged to hold a head 54 on an arm 53 of said cam arm 52, outwardly by means of its periphery, so that said cam plate 52 is normally in a position where it can not affect the winding pawl. When, however, the spring 47 is completely wound up, a depression 56 in the periphery in said control plate allows the head 54 to enter therein, being pressed against it by a spring 53$^a$, and in this position swings the arm 52 so that when the winding pawl reaches the end of its stroke, the said arm 52 will underlie the projection 50 of said pawl, and thus cam said pawl out on its return stroke.

Means are provided for disconnecting the computing mechanism from the numeral keys.

For this purpose, a forwardly extending rod (see Figs. 3, 4, 29 and 44) 34 lying beneath the key-board, has a handle 35 by which it may be slid inwardly or outwardly with its rear end riding idly in a bearing on the standard 45. When said slide 34 is moved inwardly, a cam surface 36 thereon strikes a pin 37 in a forwardly extending arm 38 fast on the rock shaft 33, through which the computing escapement mechanism is operated. In so doing, it swings the rearwardly extending arms 32 of said rock shaft downwardly, so that they are beyond the movement of the key-levers.

Said pin 37 is not fast on said arm 38, but is fast in a slide 40 working in said arm 38, which slide is drawn forwardly normally by a spring 41, so that a tongue thereon tends to enter a notch 39$^a$ in the link 39, said tongue and notch forming the only connection for moving the link 39 from the rock shaft 33. Thus it will be seen that when the slide 34 is moved inwardly, the computing machine escapement is entirely disconnected from the operation of the numeral keys. Said link 39 is prevented from being moved outwardly beyond the reach of said tongue by means of a strap 38$^a$ extending around it. From this, it will be seen that the spring 41 normally tends to draw the slide 40 forwardly into position, so that the numeral keys are connected to the computing mechanism, and said slide 34 is locked in its rearward position by means of a notch 42 therein catching on the strap 43 by which it is supported from the frame of the machine.

The computing wheels may all be set to read zero at any time by a simple zero-setting device. Said device (see Figs. 19 and 43) comprises the cylindrical casing 90 in which the numeral wheels 89 are mounted, which casing is mounted between the flanges 247 of the totalizer, and carries on it a leaf 148 pivoted at 149 on the upper edge of the sight opening 147 in such a way that when swung down the inner end 152 of said leaf will lie in the path of a pin 150 on each of the numeral wheels. Said casing 90 is revoluble between said flanges, and if the leaf 148 is swung down, as described above, and the releasing slide 141 is operated to release the numeral wheels from their locking members, the casing 90 may be revolved completely around so as to intercept in its revolution all said pins. When said casing 90 has made one complete revolution, the leaf 148 will be thrown outwardly by means of the spring 151 so as to display the numerals at the sight opening 147; and the pins 150 are so arranged, that when the casing 90 is thus revolved, the numeral wheels will all have their zeros displayed before the sight opening 147. The leaf 148 is held down to intercept the pins as it revolves by lugs 153 projecting from the main body of the totalizer and embracing the casing 90, except for a sufficient opening of the sight opening. The cylindrical casing 90 is nicked so that the fingers of the operator may easily get a good hold on it to turn it.

Variations may be resorted to within the scope of the invention, and portions of the improvements may be used without others.

What is claimed is—

1. In a combined typewriting and computing machine, the combination with a series of figure-key levers, a rock shaft beneath said levers and arms fixed on said shaft and adapted to be rocked by said levers, of a slide 34 extending rearward from the front of the machine and constructed to rock said shaft to carry said arms out of operative engagement with the key levers.

2. In a combined typewriting and computing machine, the combination with a set of figure-key levers and a rock shaft beneath said levers, of means connected with the rock shaft whereby it is rocked by the key-levers, a computing register and connections between said rock shaft and said register, and a slide extending beneath the machine adapted to be operated by hand, said slide being constructed to disconnect the rock shaft from the key levers and also to disconnect said rock shaft from the computing mechanism.

3. In a combined typewriting and computing machine, the combination with a set of figure-key levers and a rock shaft, of a forwardly projecting arm on said shaft, a computing mechanism, a link between said arm and said computing mechanism, a latch carried by the arm and normally in engagement with said link, and means for disconnecting said latch.

4. In a combined typewriting and computing machine, the combination comprising a series of letter and figure types and keys with connections thereto, a carriage mechanism adapted to be actuated under the key control, letter space distances by each of said letter and figure keys, a computing mechanism adapted to be actuated under the key control from denomination to denomination and for figure values by each of the figure keys, an escape shaft, a motor for driving said shaft, a ratchet wheel for limiting the movement of the shaft, and means for adjusting said ratchet wheel upon its axis relatively to said shaft.

5. In a combined typewriting and computing machine, the combination with the motor and escape shaft, of the variable stop device comprising a hub mounted on said shaft and provided with teeth, a series of stops for a part of said teeth, means to make said stops operative for all the said teeth, and means for throwing said hub into and out of engagement with the escape shaft whereby the movements of the shaft are variably limited.

6. In a combined typewriting and computing machine, the combination with a series of figure-keys, a computing mechanism and an escape shaft for said mechanism, of a stop slide movable longitudinally of said shaft to three different positions, stops carried by said slide and connections from the figure-key levers to said stops, for the purpose set forth.

7. In a combined typewriting and computing machine, the combination with an escape shaft, of variable stop mechanism for said shaft comprising a hub on said shaft having teeth in several different transverse planes, a stop slide adjacent to said hub and provided with several movable stops, a set of figure-key levers, and means for adjusting said slide and said stops by said levers for the purpose set forth.

8. In a combined typewriting and computing machine, the combination with an escape shaft, of means for variably stopping said shaft comprising a slide movable longitudinally of the shaft, movable stops on said slide, figure-key levers, and connections from each of said figure-key levers for simultaneously controlling the movements of said slide and said stops.

9. In a combined typewriting and computing machine, the combination with the figure-key levers, of a stop slide movable on fixed guides adjacent to the escape shaft, stop levers carried by said slide, elbow levers adapted to operate said stop levers, rods connected to said elbow levers, additional elbow levers arranged to operate said rods and connections between said latter elbow levers and the key levers.

10. In a combined typewriter and computing register, the combination with an intermittently movable paper carriage, a sliding register case intermittently movable in correlation therewith, of a rack connected to said case, said rack having beveled teeth separated by slots or openings, and a double pawl having an inclined blade to coöperate with the beveled teeth to position the register case and having a second blade adapted to enter between said teeth to lock the register case, for the purpose set forth.

11. In a combined typewriter and computing register, the combination with intermittently movable paper carriage, a register case intermittently movable in correlation therewith, of a rack and moving pawl therefor, and a second rack and locking pawl for locking the case in position while the register mechanism is being operated.

12. In a combined typewriter and computing register, the combination with intermittently movable paper carriage the register case intermittently movable in correlation therewith, of the moving rack and pawl, the locking rack and pawl, and means for simultaneously disengaging said pawls from their racks to permit the register case to be adjusted at will.

13. In a computing register, the combination with a register case, a series of register rings, and a series of radially movable carrying pinions, of a rack and pawl for feeding the register, a second rack and pawl for locking the register, and means for simultaneously disengaging the register from said pinions and from said racks and pawls.

14. In a computing register, the combination with a series of register rings, a case therefor, a series of radially movable carrying pinions within said rings, and racks and pawls for feeding said register case and rings and locking them in their operative positions, of a slide having cam surfaces constructed and arranged to free said register case from said pawls and said pinions.

15. In a computing register, the combination with a register case and rings, of the fixed cores upon which said rings turn and travel longitudinally, the slide mounted on one of said cores adapted for locking the rings temporarily, and the spring-seated teeth in the other core for locking said rings, for the purpose set forth.

16. In a computing register, the combination with the register rings, of the radially movable slide mounted within said rings, carrying pinions mounted on said slide, the core upon which said rings are mounted, the rock shaft within said core having a rib engaging said slide and connections between the figure-key levers and said rock shaft whereby the pinions are engaged with the rings when a key is depressed and disengaged as a key is released, for the purpose set forth.

17. The combination of a series of letter and figure types and connections and keys therefor, a carriage connected for letter space movements to all the keys, a computing device, means for imparting a step-by-step motion to said computing device, including a vibrating part and independent connections between said part and each of the figure keys.

18. The combination of a series of letter and figure types and connections and keys therefor, a carriage connected for letter-space movements to all the keys, a computing device, and means for imparting a step-by-step motion to the computing device including a plurality of levers, a rock shaft upon which said levers are mounted, and a vibrating member connected with said levers and adapted to move the computing device.

19. The combination of a series of letter and figure types and independently operable connections and keys therefor, a carriage connected for letter-space movements to all the keys, a computing device, said carriage and said computing device being relatively movable to permit computation at different positions across the work-sheet, a set of independent connections to the figure keys for producing a step by step motion of the computing device, and a locking device to hold and aline the same at each of its positions.

20. The combination of a series of letter and figure types and independently-operable connections and keys therefor, a carriage connected for letter-space movements to all the keys, a computing device, additional independent connections to the figure keys for producing step by step and figure value motions, a locking device to hold and aline the computing device at each of its positions, and means to cause the figure value movements during the periods when the computing device is locked against displacement.

21. The combination of a series of letter and figure types and independently-operable connections and keys therefor, a carriage connected for letter-space movements to all the keys, a computing device including a series of adding wheels and a series of carriers, additional independent connections from the figure keys to the computing device for producing step by step and figure value motions, a device to move said carriers into and out of mesh with said wheels at each computation, and a locking and alining device connected with said carrier-moving device to adjust the computer while the carriers are brought in mesh with the adding wheels.

22. In a combined typewriter and computing machine the combination of a series of letter and figure types and independently-operable connections and keys therefor, a carriage connected for letter-space movements to all the keys, a computing device including a series of adding wheels and a series of carriers, additional independent connections from the figure keys to the computing device for producing step by step and figure value motions, a device to move said carriers into or out of mesh with said wheels at each computation, a locking and alining device connected with said carrier-moving device to adjust the computer while the carriers are brought in mesh with the adding wheels, and a key controlled source of power to operate said wheels while in mesh with the carriers and in their locked position.

23. In a combined typewriting and adding machine, the combination with typewriting mechanism, including a carriage, suitable letter and numeral keys and printing means operated by said keys, and adding devices comprising a plurality of members, one of which is movable denominationally relatively to another, of two distinct step-by-step mechanisms, one, controlled by all the keys of the typewriter, adapted to actuate the typewriter carriage, and the other adapted to produce, under the control of the numeral keys, denominational movements of the denominationally movable member of the adding devices, and a plurality of means each adapted to move to a different denominational position said movable member of the adding devices.

24. The combination of a typewriting mechanism including a traveling carriage, escapement devices controlling movements of said carriage, an adding mechanism, escapement devices controlling denominational movements of the adding mechanism, another set of escapement devices controlling figure value movements of the adding mechanism, and a series of keys certain of said keys adapted to effect actuation of all of said escapement devices, certain of said keys adapted to effect actuation of two of said sets of escapement devices, and certain of said keys, adapted to effect actuation of only one of said sets of escapement devices.

25. The combination of a typewriting mechanism including a traveling carriage, printing keys including numeral keys, power operated escapement devices controlling step by step movements of said carriage, an adding mechanism, means actuated by said numeral keys of the typewriting mechanism for effecting denominational movements of the adding mechanism, and power operated escapement devices controlled by said numeral keys for effecting figure value movements of the adding mechanism.

26. In a combined typewriting and adding mechanism, the combination with three sets of means for effecting step by step movements of the typewriter carriage, denominational movements of the adding devices and figure value movements of the adding devices, of finger keys controlling all of said movements and some of which are adapted to directly actuate the means effecting one of said movements.

27. In a combined typewriting and computing mechanism, the combination with means for writing letters and figures and including suitable keys, and a carriage mechanism adapted to be actuated letter space distances under the control of each of said keys, of a plurality of numbered disks, a carrying mechanism including a member on each of said disks and other movable parts each coöperating with one of the aforesaid members to intermittently transmit movement therefrom to an adjacent disk, locking means for each disk normally preventing movement of the last said part of the carrying mechanism, a driver, means under the control of the figure keys to cause a relative denominational movement between the members of the carrying mechanism and between the driver and the numbered disks, means under the control of said keys for actuating the numbered disks figure value distances, and means under the control of said keys for shifting said movable parts of the carrying mechanism, said means operating to produce a timed motion different from that of the key and during movement of the key in but one direction.

28. In a combined typewriting and computing mechanism, the combination with means for writing letters and figures and including suitable keys, and a carriage mechanism adapted to be actuated letter space distances under the control of each of said keys, of a plurality of numbered disks, a carrying mechanism including a member on each of said disks and other movable parts, each coöperating with one of the aforesaid members to intermittently transmit movement therefrom to an adjacent disk, and means under the control of the figure keys for maintaining said movable parts in one position during a portion of the time that a figure key is depressed and in a different position during another portion of the time when the key is depressed, the motion imparted to said parts being timed differently from that of the key by which such movement is produced.

29. In a combined typewriting and computing mechanism, the combination with means for writing letters and figures and including suitable keys, and a carriage mechanism adapted to be actuated letter space distances under the control of each of said keys, of a plurality of numbered disks, a carrying mechanism for transmitting movement from one disk to another, a power driven driver adapted to actuate said numbered disks, means under the control of the figure keys to cause a relative denominational movement between the driver and the numbered disks, locking devices adapted to lock all of said disks against rotation except that engaged by the driver, means to unlock the disks representing orders above that engaged by the driver when a carrying operation is required, and means under the control of said keys for releasing all of said disks from the locking means, said means operating during movement of a key in one direction only and producing a motion which is timed differently from that of the key.

30. In a combined typewriting and computing mechanism, the combination with means for writing letters and figures and including suitable keys, and a carriage mechanism adapted to be actuated letter space distances under the control of each of said keys, of a plurality of numbered disks adapted to be actuated denominational and figure value distances under the control of each of the figure keys, a gear connected with each of said disks, a carrying mechanism including a member on each of said disks, and other movable parts each coöperating with one of said gears to intermittently transmit movement therefrom to an adjacent disk and gear, and means under the control of the figure keys for maintaining said movable parts in one position during a portion of the time that a figure key is depressed and in a different position during another portion of the time when a key is depressed, the motion imparted to said parts being timed differently from that of the key by which said movement is produced.

31. In a combined typewriting and computing mechanism, the combination with means for writing letters and figures and including suitable keys, and a carriage mechanism adapted to be actuated letter space distances under the control of each of said keys, of a plurality of numbered disks adapted to be actuated denominational and figure value distances under the control of each of the figure keys, a gear connected with each of said disks, a carrying mechanism including a member on each of said disks and pinions movable to and from engagement with said gears, and means for maintaining said pinions in mesh with said gears during a part of the time that a figure key is depressed, and out of engagement with said gears during the remainder of the time that the key is depressed, such motion of said gears being differently timed from that of the key by which such movement is produced.

32. In a combined typewriting and computing mechanism, the combination with means for writing letters and figures and including suitable keys, and a carriage mechanism adapted to be actuated letter space distances under the control of each of said keys, of a plurality of numbered disks, a gear connected with each of said disks, a carrying mechanism including a member integral with each of said disks and pinions each coöperating with one of the aforesaid members to intermittently transmit movement therefrom to an adjacent disk, a driver under the control of the figure keys for moving said disks figure value distances, means under the control of the figure keys for producing a relative denominational movement between the driver and disks, and means under the control of each figure key for producing a relative movement between the pinions and gears to maintain them in engagement during a part of each key action and out of engagement during the remainder of such action, said movement being differently timed from that of the key which produces it.

33. In a combined typewriting and computing machine, the combination with numeral typewriting keys, of computing mechanism controlled thereby and including a carriage moving step by step at the operation of said keys, and also including a master-wheel and a set of computing wheels whose relative positions are controlled by said carriage so that the same carriage movement which unmeshes the master-wheel from one meshes it with another computing wheel, and means common to said numeral keys for camming said carriage to its true position and locking it there at the computing operation.

34. In combination with a typewriter and computing device a series of figure types and keys connected thereto, a computing mechanism operatively connected to the figure keys, means to communicate figure values to the computing mechanism, mechanism to give the computing mechanism approximately its denominational position, and two parts actuated by said figure keys, one to give the computing mechanism step-by-step movements to its approximate positions, and the other to aline and lock it for all computations.

35. In a combined typewriting and computing machine, the combination with numeral typewriting keys, of computing mechanism controlled thereby and including a carriage moving step by step at the operation of said keys, and also including a master-wheel and a set of computing wheels whose relative positions are controlled by said carriage so that the same carriage movement which unmeshes the master-wheel from one meshes it with another computing wheel, and a beveled rack and beveled dog mechanism connected to be operated by said numeral keys for camming the carriage to its true position and locking it there for the computing operation.

36. The combination of typewriting and adding mechanism, figure types and keys used for writing figures to be added and not to be added, a step by step carriage mechanism, figure value mechanism, a denominational mechanism, means to actuate said denominational mechanism, including a common driver actuable by the depression of any figure key, and means to disconnect the figure keys and denominational mechanism when the figures written are not required to be added.

37. In a combined typewriting and computing machine, the combination with a typewriter carriage, figure type, letter type, and keys for actuating the type, of a computing mechanism including a member adapted to be actuated figure value distances under the control of the figure keys, a plurality of stops for limiting such movements, said stops being less in number than the figure keys, and means whereby each stop may be actuated by a plurality of figure keys.

38. In a combined typewriting and computing machine, the combination with a typewriter carriage, figure type, letter type, and keys for actuating the type, of a computing mechanism including a member adapted to be actuated figure value distances under the control of the figure keys, a plurality of adjustable stops for limiting such movements, and means whereby a plurality of figure keys are adapted to adjust each of said stops.

39. In a combined typewriting and computing machine, the combination with a typewriter carriage, figure type, letter type, and keys for actuating the type, of a computing mechanism including a member adapted to be rotated figure value distances, a stop device rotating with said member, a plurality of stops coöperating with said stop device to limit such movements of the computing mechanism, and means whereby each of the last said stops may be actuated by a plurality of figure keys.

40. In a combined typewriting and computing machine, the combination with a typewriter carriage, figure type, letter type, and keys for actuating the type, of a computing mechanism including a member adapted to be adjusted through different figure value distances, and means for controlling such movements including a stop adapted to be adjusted to different positions by each of a plurality of figure keys, whereby the number of stops required is less than the number of figure keys.

41. In a combined typewriting and computing machine, the combination with numeral keys and computing wheels, of a master wheel for turning said computing wheels *seriatim* to an extent determined by the numeral key operated, carry-over devices whereby wheels of higher denominations are operable by said master wheel, locking devices for holding each computing wheel locked unless turned by said master wheel, step-by-step feeding means for causing said master wheel by each movement to unmesh from one and mesh with the next computing wheel, and means movable relatively to the master wheel and operable by the numeral keys, for locking said master wheel and said computing wheels against travel while said master wheel turns the computing wheel with which it engages.

42. In a combined typewriting and computing machine, the combination with numeral keys and computing wheels, of a master wheeel for turning said computing wheels *seriatim* to an extent determined by said numeral keys, means for causing relative travel between said master wheel and said computing wheels, carry-over devices arranged to carry over on each wheel to the left of the master wheel or to hold said wheels locked, and means for both withdrawing said carry-over devices and holding said wheels locked when said master wheel is moved to engage with the left hand computing wheel.

43. In a combined typewriting and computing machine, the combination with numeral keys and computing wheels, of a locking device for each computing wheel normally holding it locked, a master wheel, means for causing relative travel between said master wheel and said computing wheels, means for concomitantly releasing the computing wheels from said locking devices, and a separate locking device for holding said computing wheels locked while said master wheel travels relatively to said computing wheels.

44. In a combined typewriting and computing machine, the combination of a totalizer comprising computing wheels, figure keys, a master wheel controlled by said keys for actuating said totalizer, a traveling carriage for unmeshing the master wheel from one computing wheel and meshing it with another by a single relative movement, a coöperating tooth and rack for preventing the travel of said carriage during computation, and positive means for moving said tooth in and out of said rack.

45. In a combined typewriting and computing machine, the combination with a totalizer comprising computing wheels and numeral keys, of a master wheel for engaging said computing wheels *seriatim* to turn them to an extent determined by said keys, an escapement device controlled by said keys to cause them to thus turn, a detent to hold said totalizer and master wheel against transverse feeding during the turning of said wheels, and a single member to connect said keys to said escapement and said detent.

46. In a combined typewriting and computing machine, the combination with numeral keys and computing wheels, of a master wheel, a totalizer traveling relatively to said master wheel of which totalizer said computing wheels are part, a rock shaft operated by said numeral keys whereby the computing wheels and the totalizer are held against transverse travel when being turned, means whereby said totalizer is fed by said keys, and means whereby the totalizer can be released to be moved.

47. In a combined typewriting and computing machine, the combination with computing wheels having a transverse feed, a device for locking said wheels against rotation, and a device for locking them against traveling, of a handle, a cam thereon whereby said transverse feed is disconnected, a cam thereon for disabling the device which locks the computing wheels against traveling, and a cam thereon whereby the computing wheels are unlocked to permit them to be rotated.

48. In a combined typewriting and computing machine, the combination with numeral keys and computing wheels, of a master wheel for turning said computing wheels *seriatim* to an extent determined by the numeral key operated, means under the control of said numeral keys for causing relative movement between the computing wheels and the master wheel to cause *seriatim* engagement, means normally holding the master wheel locked against turning, a device for locking the computing wheels and master wheel against relative transverse movement, and a connection between said master wheel lock and said other lock to cause one of said locks to always be effective.

49. In a combined typewriting and computing machine, the combination with numeral keys and computing wheels, of a master wheel for turning said computing wheels *seriatim* to an extent determined by the numeral key operated, means under the control of said numeral keys for causing relative movement between the computing wheels and the master wheel to cause *seriatim* engagement, means normally holding the master wheel locked against turning, a device for locking the computing wheels and master wheel against relative transverse movement, and means under the control of the numeral keys for releasing said master wheel lock and simultaneously making said transverse movement lock effective.

50. In a combined typewriting and computing machine, the combination with numeral keys and computing wheels, of a master wheel for turning said computing wheels *seriatim* to an extent determined by the numeral keys operated, means for causing relative travel between said master wheel and said computing wheels to cause *seriatim* engagement, a rack associated with said computing wheels, a dog movable into and out of mesh with said rack to lock said master wheel and computing wheels against relative transverse movement, a lock normally engaged with said master wheel to hold it against turning, and means operated by said numeral keys for first making said dog effective on said rack to hold it, and then to release said master wheel lock.

51. In a combined typewriting and computing machine, the combination with numeral keys and computing wheels, of a master wheel for turning said computing wheels *seriatim* to an extent determined by the numeral keys operated, a totalizer casing for said computing wheels, means for normally holding every computing wheel locked, means for holding said master wheel locked, means for holding said totalizer locked against travel, and means under the control of said keys for locking said totalizer, unlocking the master wheel, and again locking the master wheel before the totalizer is unlocked.

52. In a computing machine, the combination with a traveling carriage and computing wheels thereon, of means normally holding said computing wheels locked, a master wheel for turning said computing wheels *seriatim*, means normally holding said master wheel locked, so that said master wheel is slidable past said computing wheels with its teeth in meshing position, a lock for said traveling carriage normally ineffective, numeral keys for controlling said master wheel, and means under the control of said numeral keys for locking said carriage, then unlocking said master wheel, turning it and relocking it, and for later unlocking said carriage.

53. In a combined typewriting and computing machine the combination with a traveling totalizer carriage comprising computing wheels, of a rotatable master wheel, numeral keys controlling said master wheel for turning said computing wheels *seriatim* thereby, means under the control of said numeral keys for causing the feeding of said totalizer to cause such *seriatim* engagement, a rack forming part of said totalizer carriage, and a tooth controlled by the keys and movable relatively to the master wheel into and out of said rack to hold said totalizer against feeding while said master wheel turns.

54. In a combined typewriting and computing machine the combination with a traveling totalizer carriage comprising computing wheels, of a rotatable master wheel, numeral keys controlling said master wheel for turning said computing wheels *seriatim* thereby, means under the control of said numeral keys for causing the feeding of said totalizer to cause such *seriatim* engagement, a rack forming part of said totalizer carriage, a tooth movable into and out of said rack to hold said totalizer against feeding while said master wheel turns, and an extension of said tooth comprising a beveled surface adapted to positively center the totalizer before it is so locked by said tooth.

55. In a computing machine, the combination with a totalizer comprising computing wheels, of a set of numeral keys, a rotatable master wheel to engage said computing wheels *seriatim* to turn them, a master-wheel controlling device operated by said keys, means under the control of said keys for causing said totalizer to travel to cause the computing wheels to engage the master wheel, a rack connected to said totalizer, an oscillating tooth adapted to mesh with said rack to lock said totalizer against travel while the master wheel turns, and a connection from the master wheel controlling device to said lock for causing it to operate at the proper time.

56. In a computing machine, the combination with a traveling carriage and a totalizer comprising computing wheels, of numeral keys, means under the control of said numeral keys for causing said carriage to travel, a master wheel for turning said computing wheels *seriatim* in a manner determined by the travel of said carriage, a rack forming part of said carriage, a tooth on the frame of the machine adapted to coöperate with said rack to lock said carriage against travel, means under the control of said numeral keys for moving said tooth into engagement with said rack, and an extension of said tooth comprising a beveled surface adapted to accurately center the carriage.

57. In combination, a movable carriage, printing mechanism including a series of keys, a computing device coöperatively related to the keys, and means for locking said keys during certain movements of the carriage to prevent premature printing of a character or premature operation of the computing device.

58. In combination, a typewriting machine including a carriage movable step-by-step for letter-spacing, printing mechanism including a series of keys controlling the movement of the carriage, a computing device arranged to be operated upon the depression of a key, and means for preventing the depression of any of said keys during the letter-spacing movements of the carriage.

59. In a computing device, a series of denominational members, a master means normally engaging one only of the denominational members, said members and the master means being relatively movable in a lateral direction and said master means engaging two denominational members during such movement, and means preventing the operation of the master means while the latter is in engagement with more than one denominational member and ineffective to prevent the operation of the master means when the latter is in normal engagement with a single denominational member.

60. In a computing device, the combination of a series of denominational members and a master means, said master means and denominational members having a relative lateral movement, and means for preventing the operation of the master means during the time when it is in partial engagement with one of the denominational members, but ineffective to prevent its operation when it is in full engagement with one of said denominational members.

61. In a computing device, the combination with a series of denominational members and a master means for operating said denominational members, said master means and denominational members having a relative lateral movement, of a series of numeral keys for operating said master means, and means for preventing the complete operation of said keys during all of the time when said master means is out of full engagement with one of the denominational members but ineffective to prevent their operation when said master means is in full engagement with one of said denominational members.

62. In a computing device, a series of denominational members, a master means normally engaging one only of the denominational members, said members and the master means being relatively movable in a lateral direction and said master means engaging two denominational members during such movement, means preventing the operation of the master means while the latter is in engagement with more than one denominational member, and means serving to insure the accurate location of the master means in position to properly engage a denominational member.

63. In a combined typewriting and adding machine, the combination with a paper carrier and printing instrumentalities, of keys including numeral keys for actuating said printing instrumentalities, means whereby said keys when operated cause a relative lateral movement between the printing instrumentalities and the paper carrier, a series of denominational members, a master means, means whereby said keys when operated cause a relative lateral movement between said denominational members and said master means in unison with the relative lateral movement of the printing instrumentalities and the paper carrier, whereby the master means is brought into engagement with one after another of said denominational members, and means for preventing either an operation of one of said denominational members by said master means to accumulate a digit, or an operation of any of said printing instrumentalities during the time when said master means is passing out of engagement with said denominational member.

64. In a calculating machine the combination of a traveling totalizer, a master member for registering on the same, means including keys for operating said master member, a member operated by said keys and having two intermittent movements one of which commences prior to each movement of said master member, and means operated by said intermittently moving member for preventing the travel of said totalizer during the period of movement of said master member.

65. In a calculating machine the combination of a traveling totalizer, a master member for actuating the same, figure keys, valuating connections between said keys and said master member, a rotatable shaft having a plurality of intermittent rotary movements for each movement of said master member, one of them being prior to the movement of said master member, and said shaft being connected to said keys to be operated therefrom, detaining means operative upon said totalizer and means operated by said shaft for operating said detaining means.

66. In a calculating machine the combination of a traveling totalizer, a master member for registering on the same, means including keys for operating said master member, a member operated by said keys and having two intermittent movements one of which is subsequent to each forward movement of said master member, and means operated by said intermittently moving member for preventing the travel of said totalizer during the period of movement of said master member.

67. In a calculating machine the combination of a traveling totalizer, a master member for registering on the same, means including keys for operating said master member, a member operated by said keys and having two intermittent movements one of which is subsequent to each forward movement of said master member, means operated by said intermittently moving member for preventing the travel of said totalizer during the period of movement of said master member, and means also operated by said intermittently moving member for locking one of the parts of the mechanism which operates the master member.

68. In a calculating machine the combination of a traveling totalizer, a master member for registering on the same, means including keys for operating said master member, a member operated by said keys and having intermittent movements one subsequent to each forward movement of said master member and a detaining device for preventing travel of the totalizer during the movement of said master member, one part of said detaining device being connected to and operated by said intermittently movable member and another part of said detaining device traveling in unison with the totalizer.

69. In a calculating machine the combination of a traveling totalizer, a master member for registering on the same, means including keys for operating said master member, a member operated by said keys and having intermittent movements one subsequent to the movement of said master member, a rack traveling in unison with said totalizer, a detent adapted to engage said rack, and connections between said detent and said intermittently moving member.

70. In a calculating machine the combination of a traveling totalizer, a master member for actuating the same, means including reciprocating keys for operating said master member, and means separate from and uninfluenced by said master member and operated by said keys for preventing the travel of said totalizer during the movement of said master member.

71. In a calculating machine the combination of a traveling totalizer, a master member for actuating the same to register thereon, keys, valuating connections between said keys and said master member, a detaining member for preventing the travel of the totalizer during the movement of said master member, said detaining member being separate from and uninfluenced by said master member, and connections between said detaining member and said keys, the last mentioned connections and the valuating connections having parts in common.

72. In combination, a traveling totalizer, a master member for operating the same, a detent for preventing the shifting of said totalizer when the digits are being registered thereon, keys and two sets of key connections, one operative upon said master member and the other operative upon said detent and adapted to throw it into active operation prior to the movement of said master member and out of active operation after the movement of said master member.

73. In combination, a traveling totalizer, a master member for operating the same, a detent for preventing the travel of said totalizer when the digits are being registered thereon, keys, a digit shaft, a second shaft, connections between said keys and said digit shaft for imparting a rotation thereto depending in amount upon the value of the digit to be registered, connections between said keys and said second shaft for imparting a movement thereto both prior to and subsequent to the movement of said digit shaft, connections between said digit shaft and said master member and other connections between said second shaft and said detent.

74. In a calculating machine the combination of a totalizer, figure keys, means operated by said keys for actuating said totalizer, a traveling carriage for determining the decimal place of actuation, a coöperating detent and rack for preventing the travel of said carriage, and means for establishing the engagement of said detent with said rack prior to the period of actuation of the totalizer.

75. In a calculating machine the combination of a totalizer, figure keys, means operated by said keys for actuating said totalizer, a traveling carriage for determining the decimal place of actuation, a coöperating detent and rack for preventing the travel of said carriage, and means for positively holding said detent in engagement with said rack during the period of actuation of the totalizer.

76. In a calculating machine the combination of a totalizer, figure keys, means operated by said keys for actuating said totalizer, a traveling carriage for determining the decimal place of actuation, a coöperating detent and rack for preventing the travel of said carriage, and means for positively operating said detent, said detent operating means being so timed relatively to the totalizer-actuating means as to establish the engagement of said detent with the rack prior to the period of actuation, to positively hold said detent in engagement with said rack during the period of actuation and break said engagement subsequent to said period of actuation of the totalizer.

77. In a calculating machine the combination of a totalizer, figure keys, means operated by said keys for actuating said totalizer, a traveling carriage for determining the decimal place of actuation, a coöperating detent and rack for preventing the travel of said carriage, and operating means non-yieldingly connected to said detent for positively pulling and pushing the same into and out of engagement with said rack.

78. In a combined typewriting and computing machine, the combination with numeral keys and computing wheels, of a master wheel for turning said computing wheels *seriatim* each to an extent determined by the key operated, step-by-step feeding means for causing said master wheel by each relative movement to be unmeshed from one and meshed with the next computing wheel, and means movable relatively to the master wheel and operable by the numeral keys, for locking said master wheel and said computing wheels against relative travel while said master wheel turns the computing wheel with which it engages.

In testimony whereof I have signed my name to this specification in the presence of two subscribing witnesses, April 26, 1904.

BENJAMIN M. DES JARDINS.

Witnesses:
  EDWARD B. EATON,
  M. E. F. CUNNINGHAM.

Copies of this patent may be obtained for five cents each, by addressing the "Commissioner of Patents, Washington, D. C."